US011752903B2

(12) United States Patent
Sandbothe et al.

(10) Patent No.: US 11,752,903 B2
(45) Date of Patent: **\*Sep. 12, 2023**

(54) USER-DEFINED STIMULATION PATTERNS FOR JUVENILE PRODUCTS

(71) Applicant: Thorley Industries, LLC, Pittsburgh, PA (US)

(72) Inventors: Erica Sandbothe, Pittsburgh, PA (US); Kevin Dowling, Westford, MA (US); Mary J. Koes, Pittsburgh, PA (US); Arjit Arora, Pittsburgh, PA (US); Suraj Joseph, Coraopolis, PA (US); Mara McFadden, Pittsburgh, PA (US); Richard Juchniewicz, Pittsburgh, PA (US)

(73) Assignee: Thorley Industries, LLC, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/368,405

(22) Filed: Jul. 6, 2021

(65) Prior Publication Data
US 2021/0405633 A1 Dec. 30, 2021

Related U.S. Application Data

(63) Continuation of application No. 16/444,179, filed on Jun. 18, 2019, now Pat. No. 11,054,819, which is a
(Continued)

(51) Int. Cl.
*G05D 1/00* (2006.01)
*G06F 16/29* (2019.01)
(Continued)

(52) U.S. Cl.
CPC ............. *G05D 1/0016* (2013.01); *A47D 9/02* (2013.01); *A47D 13/00* (2013.01); *A47D 13/10* (2013.01);
(Continued)

(58) Field of Classification Search
CPC ..... G05D 1/0016; H04W 4/70; B60L 2200/20
(Continued)

(56) References Cited

U.S. PATENT DOCUMENTS 5,082,326 A * 1/1992 Sekido .................. B60N 2/914
297/284.6
6,989,497 B1 * 1/2006 Lee ......................... G05G 9/047
200/6 A
(Continued)

FOREIGN PATENT DOCUMENTS

GB 2511915 A * 9/2014 ............... A47D 9/02

OTHER PUBLICATIONS

Smith, Karen, Deborah Buehler, and Heidelise Als. "NIDCAP Nursery Certification Program (NNCP) Nursery Assessment Manual." NIDCAP Federation International (2011).pp. 1-92 (Year: 2011).*
(Continued)

*Primary Examiner* — Satish Rampuria
(74) *Attorney, Agent, or Firm* — Perman & Green, LLP

(57) ABSTRACT

Systems and methods define a stimulation pattern for a juvenile product utilizing a mobile device that executes a mobile application that is linked to the juvenile product. The method comprises the step of recognizing, by the mobile device when executing the mobile app, the user-defined stimulation pattern for the juvenile product. The stimulation pattern can be a vibration pattern or a motion pattern, and can be detected in a number of different ways by the mobile device. The method further comprises the step of determining control signals for the actuator(s) of the juvenile product based on the user-defined stimulation pattern that is recognized by the mobile device. The method further comprises the step of, in response to receiving a command to execute
(Continued)

the user-defined stimulation pattern, controlling the actuator(s) of the juvenile product based on the stored control signals for the user-defined stimulation pattern.

18 Claims, 15 Drawing Sheets

Related U.S. Application Data continuation of application No. 15/130,128, filed on Apr. 15, 2016, now Pat. No. 10,324,460.

(60) Provisional application No. 62/148,563, filed on Apr. 16, 2015.

(51) Int. Cl.

| | |
|---|---|
| *A47D 9/02* | (2006.01) |
| *A47D 13/10* | (2006.01) |
| *B60N 2/28* | (2006.01) |
| *B60R 21/0134* | (2006.01) |
| *H04W 4/70* | (2018.01) |
| *B60N 2/00* | (2006.01) |
| *B60L 1/14* | (2006.01) |
| *B60N 2/26* | (2006.01) |
| *B62B 5/00* | (2006.01) |
| *A47D 13/00* | (2006.01) |
| *G05D 19/02* | (2006.01) |
| *G08C 17/02* | (2006.01) |
| *B60R 21/013* | (2006.01) |
| *B60R 21/207* | (2006.01) |
| *B60R 22/10* | (2006.01) |
| *G05B 19/414* | (2006.01) |
| *G05F 1/66* | (2006.01) |
| *H04W 4/20* | (2018.01) |
| *B60R 21/01* | (2006.01) |
| *B62B 7/10* | (2006.01) |

(52) U.S. Cl.
CPC ............ *B60L 1/14* (2013.01); *B60N 2/002* (2013.01); *B60N 2/265* (2013.01); *B60N 2/286* (2013.01); *B60N 2/2809* (2013.01); *B60N 2/2812* (2013.01); *B60N 2/2821* (2013.01); *B60N 2/2851* (2013.01); *B60N 2/2863* (2013.01); *B60N 2/2875* (2013.01); *B60N 2/2884* (2013.01); *B60R 21/013* (2013.01); *B60R 21/0134* (2013.01); *B60R 21/2072* (2013.01); *B60R 22/105* (2013.01); *B62B 5/004* (2013.01); *G05B 19/414* (2013.01); *G05D 19/02* (2013.01); *G05F 1/66* (2013.01); *G06F 16/29* (2019.01); *G08C 17/02* (2013.01); *H04W 4/20* (2013.01); *H04W 4/70* (2018.02); *B60L 2200/20* (2013.01); *B60N 2002/2815* (2013.01); *B60R 2021/01252* (2013.01); *B62B 7/10* (2013.01); *G05B 2219/23051* (2013.01); *G05B 2219/36168* (2013.01); *G05D 2201/0212* (2013.01)

(58) Field of Classification Search
USPC .................................................. 700/275–306
See application file for complete search history.

(56) References Cited

U.S. PATENT DOCUMENTS

| | | | | |
|---|---|---|---|---|
| 7,990,365 | B2* | 8/2011 | Marvit | .................... G06F 3/017 |
| | | | | 345/158 |
| 10,691,726 | B2* | 6/2020 | Rapaport | ............... G06Q 30/02 |
| 2007/0099031 | A1* | 5/2007 | Chung | .................... G11C 11/16 |
| | | | | 428/815 |
| 2010/0176952 | A1* | 7/2010 | Bajcsy | ................. A61B 5/6887 |
| | | | | 340/573.1 |
| 2015/0038072 | A1* | 2/2015 | Cordier | ................ A47D 13/107 |
| | | | | 455/39 |

OTHER PUBLICATIONS

Srivastava, Jayesh, and L. H. Shu. "Affordances and environmentally significant behavior." International Design Engineering Technical Conferences and Computers and Information in Engineering Conference. vol. 45066. American Society of Mechanical Engineers, 2012.pp. 1-9 (Year: 2012).*

Park, Sungmee, and Sundaresan Jayaraman. "Enhancing the quality of life through wearable technology." IEEE Engineering in medicine and biology magazine 22.3 (2003): pp. 41-48. (Year: 2003).*

Emiliani, Pier Luigi, Constantine Stephanidis, and Gregg Vanderheiden. "Technology and inclusion—Past, present and foreseeable future." Technology and Disability 23.3 (2011): pp. 101-114. (Year: 2011).*

Agrawal, Sandip, et al. "Using mobile phones to write in air." Proceedings of the 9th international conference on Mobile systems, applications, and services. 2011.pp. 15-28 (Year: 2011).*

Enkel, Ellen, and Oliver Gassmann. "Creative imitation: exploring the case of cross-industry innovation." R&d Management 40.3 (2010): pp. 1-13. (Year: 2010).*

* cited by examiner

US 11,752,903 B2

USER-DEFINED STIMULATION PATTERNS FOR JUVENILE PRODUCTS

CROSS-REFERENCE TO RELATED APPLICATIONS

This application is a continuation of U.S. application Ser. No. 16/444,179, filed Jun. 18, 2019, (now U.S. Pat. No. 11,054,819), which is a continuation of U.S. application Ser. No. 15/130,128, filed Apr. 15, 2016, (now U.S. Pat. No. 10,324,460), which is a non-provisional of and claims the benefit of U.S. provisional patent application Ser. No. 62/148,563, filed Apr. 16, 2015, the disclosures of which are incorporated herein by reference in their entireties.

The present application is related to the following U.S. Patent Application Nos. U.S. patent application Ser. No. 15/130,135, entitled CHILD RESTRAINT SYSTEM; and, U.S. patent application Ser. No. 15/130,256, (now U.S. Pat. No. 10,042,358), entitled MOBILE APPLICATION FOR WHEELED JUVENILE PRODUCT which are incorporated herein by reference in their entireties.

BACKGROUND

Many juvenile products, such as bouncy seats and swings, include motors or other actuators for imparting a stimulation pattern in the form of a motion or vibration pattern that is enjoyable to the juvenile occupant. Such juvenile products typically have a limited number of preprogrammed motion or vibration patterns and/or speeds that the juvenile's caregiver can select through an interface on the juvenile product. Simple juvenile products have one motion pattern (e.g., back and forth swinging) at one or a couple different speeds. More sophisticated juvenile products have more preprogrammed motion patterns, with each having a number of different possible speed settings. For example, the mamaRoo® swing from Thorley Industries, d/b/a 4moms, is a swing with five different preprogrammed motion patterns, each selectable in one of five different speeds. The caregiver can select the desired preprogrammed pattern and speed combination through a control panel on the base of the swing.

SUMMARY

In one general aspect, the present invention is directed to systems and method for defining a stimulation pattern for a juvenile product, such an infant swing, bouncer seat, crib, a stroller, etc., that has a juvenile-supporting structure (e.g., a seat) and at least one actuator (e.g., a motor) for imparting a motion or vibration on the juvenile-supporting structure. In various embodiments, the systems and methods utilize a mobile device, such as a smartphone or tablet computer, that executes a mobile application (a "mobile app") that is linked to the juvenile product. The method can comprise the step of recognizing, by way of the mobile device executing the mobile app, the user-defined stimulation pattern for the juvenile product. The stimulation pattern can include a vibration pattern and/or a motion pattern for the juvenile product, and can be detected in a number of different ways by the mobile device, such as (i) the user drawing a motion pattern on a pressure-sensitive touchscreen of the mobile device, (ii) the user moving the mobile device in free space with the movements captured by motion-sensing elements of the mobile device, such as accelerometers, magnetometers, and gyroscopes, or (iii) by translating an audio waveform of a sound recording to a vibration pattern. The method further comprises the step of determining control signals for the actuator(s) of the juvenile product based on the user-defined stimulation pattern. The control signals can be computed by the mobile device, by the juvenile product, or by a remote server connected to the Internet, or by a combination thereof. The method further comprises the step of, in response to receiving a command to execute the user-defined stimulation pattern, controlling the actuator(s) of the juvenile product based on the stored control signals for the user-defined stimulation pattern, to thereby move the juvenile-supporting structure of the juvenile product in accordance with the user-defined stimulation pattern.

Various embodiments of the present invention can provide an efficient way for a caregiver to define a personalized stimulation pattern for the juvenile using the juvenile product. These and other potential benefits with various embodiments of the present invention will be apparent from the description that follows.

FIGURES

Various embodiments of the present invention are described herein by way of example in connection with the following figures, wherein.

DESCRIPTION

In one general aspect, the present invention is directed to a "mobile app," e.g., a software application that runs on a mobile device, such as a smartphone or tablet computer, that allows the user of the mobile app to define stimulation patterns for a juvenile product that is linked to the mobile device/app. The juvenile product can be an infant swing, a bouncer seat, a crib, a stroller, or any other suitable juvenile product with a juvenile-supporting structure on which the juvenile sits or lies, for example. The juvenile product comprises at least one actuator (e.g., a motor) that imparts a motion on the juvenile-supporting structure of the juvenile product. The motion could be as simple as a vibration, or motion in one, two, or three dimensions. Through the app, the user can define a stimulation pattern (e.g., a vibration or motion pattern) that is uploaded to the juvenile product in order to control the movement of the juvenile product (by controlling the actuator(s) thereof) according to the user-defined stimulation pattern.

Figure 1:
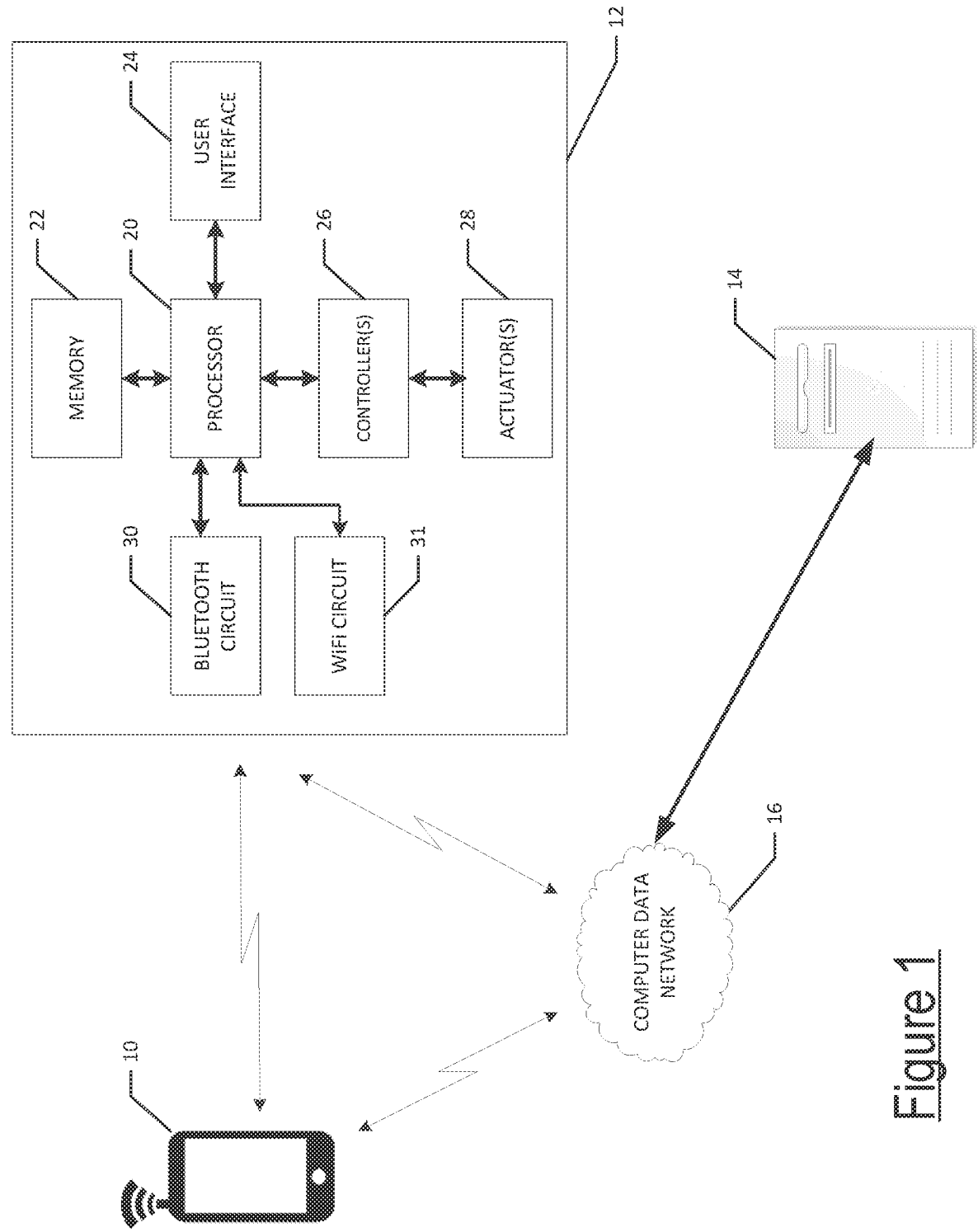
FIG. 1 is a block diagram of a system according to various embodiments of the present invention.
Figure 2:
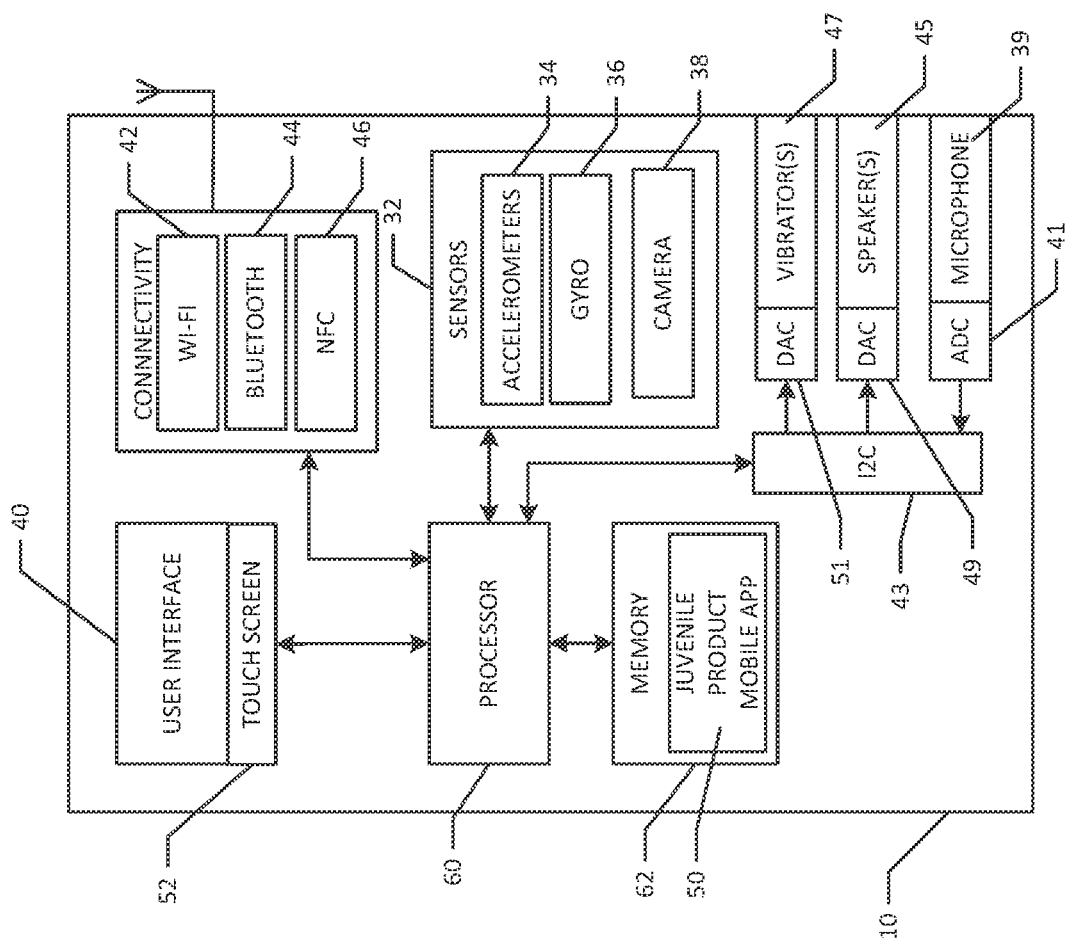
FIG. 2 is a block diagram of a mobile device.

FIG. 1 is a block diagram that illustrates aspects of the present invention according to various embodiments. The diagram shows the mobile device 10, the juvenile product 12, and a remote server 14. Each of the mobile device 10, the juvenile product 12, and the remote server 14 may communicate via one or more computer data networks 16. FIG. 2 is a block diagram of the mobile device 10. The mobile device 10 may be, for example, a smartphone, a tablet computer, a wearable computer, or any other suitable, mobile computing device that includes, as shown in FIG. 2, at least one processor 60 that is capable of downloading mobile apps from the server 14 via the network 16 for storage in memory 62, and executing the downloaded app(s). The mobile device 10, as shown in FIG. 2, also preferably comprises a user interface 40 through which the mobile device user can control and otherwise use the downloaded mobile app for the juvenile product. The mobile device 10 also preferably includes wireless communication capabilities that allow it to communicate wirelessly with the juvenile product 12 and to connect wirelessly to the network 16. For example, the mobile device 10 may include a WiFi (IEEE 802.11x) communication circuit 42 that allows it to connect to the network 16 via an external wireless access point (WAP) and router. The mobile device 10 may also comprise circuitry for connecting to a cellular network that connects to the network 16. The WiFi communication circuit 42 could also establish an ad hoc WiFi connection with the juvenile product 12 (assuming the juvenile product was equipped with WiFi networking capability).

In addition or in lieu of the WiFi capabilities, the mobile device 10 may comprise other types of wireless communication capabilities. For example, the mobile device 10 may comprise Bluetooth and/or Near-field Communication (NFC) circuitry 44, 46 that allows the mobile device 10 to communicate wirelessly via Bluetooth or Near-field Communication (NFC) channels, as the case may be, with a paired device, such as the juvenile product 12. In addition or alternatively, the mobile device 10 could posses other types of wireless communication capabilities, such as ZigBee, Z-Wave, or Wireless USB, for example, that allow the mobile device 10 to communicate wirelessly with the juvenile product 12 and/or the network 16.

As shown in FIG. 2, the user interface 40 of the mobile device 10 may include a pressure-sensitive touch screen 52 that detects when a user of the mobile device 10 touches the touch screen 52 of the user interface 40. The touchscreen may be, for example, a capacitive touchscreen panel that consists of an insulator such as glass, coated with a transparent conductor such as indium tin oxide (InSn0). The touchscreen 52 includes circuitry for detecting, for each detected touch, the location of the touch on the screen (p), the duration of the touch (t), and the intensity (force) of the touch (1). This touchscreen capability is valuable for programming a user-defined vibration or motion pattern for the juvenile product 12 via the mobile app 50, as described further below.

In addition, as shown in FIG. 2, the mobile device 10 preferably also includes a sensor assembly 32, including an accelerometer system 34 and a gyroscope 36. The accelerometer system 34 may include a three-axis accelerometer and the gyroscope 36 detects three-axis angular acceleration around the X, Y and Z axes, enabling calculation of roll ($\phi$), pitch ($\theta$), and yaw ($\psi$) rotations of the mobile device as imparted by the user of the mobile device. The combined data from the accelerometer 34 and the gyroscope 36 provide detailed and precise information about the mobile device's six-axis movement in space. The three axes of the gyroscope 36 combined with the three axes of the accelerometer 34 enable the mobile device 10 to recognize approximately how far, how fast, and in which direction the mobile device 10 has moved in space. This capability is also valuable for programming a user-defined motion pattern for the juvenile product 12 via the mobile app 50, as described further below. The mobile device 10 may also include a camera 38, such as a CCD/CMOS camera, which could also be used for recognizing a user-defined stimulation pattern. The mobile device 10 may also include controllers, codecs, and converters (e.g., analog-to-digital) that are not shown in FIG. 2 for the sake of simplicity and because they are well known and not necessary for a clear understanding of how the various embodiments of the present invention operate.

The mobile device's memory 62 may include internal Random Access Memory (RAM), Read Only Memory (ROM), flash memory, and/or removable storage. The RAM may be, for example, LPDDR2 DRAM; the ROM may include one or more memory chips; the flash memory may include a SSD or emmc flash memory; and the optional removable storage may include a form of microSD card. One or more of these memory units may store the juvenile product mobile app 50, which is a software application that when executed by the processor 60 causes the processor 60 to capture and upload to the juvenile product 12 a stimulation pattern defined by the mobile device user via the mobile device/app.

The mobile device 10 may also comprise a microphone 39 that is connected to the processor 60. In that connection, the mobile device 10 may include an analog-to-digital converter (ADC) 41 to convert audio picked up by the microphone 39 to digital format for processing by the processor 60. The microphone 39 and the processor 60 may be in communication via an I2C data bus 43. The microphone 39 is valuable for programming a user-defined vibration pattern for the juvenile product 12 via the mobile app 50 using a sound recording, as described further below. Also as shown in FIG. 2, the mobile device 10 may comprise one or more audio speakers 45 and one or more vibrators (e.g., a small vibration motor) 47 for vibrating the mobile device 10, each having associated digital-to-analog converters.

The juvenile product 12 may be any juvenile product that has at least one motor or other types of actuator 28 that imparts movement on the juvenile-supporting structure of the juvenile product 12, such as a motion pattern or vibration pattern, to soothe or otherwise mollify or pacify the juvenile that occupies the juvenile-supporting structure of the juvenile product 12. To that end, the juvenile product 12 could be a swing, a bouncer seat, a crib, or a stroller, for example, with a juvenile-supporting structure in which the juvenile sits or lies. As shown in FIG. 1, the juvenile product 12 preferably is also "smart" in the sense that it also includes one or more processors 20, memory 22 for storing software that is executed by the processor 20 (which may be internal and/or external to the processor 20), and user interface 24. The user interface 24 may include, for example, a touch-screen and/or control panel that allows a user of the juvenile product 12, i.e., a caregiver for the juvenile, to control the operation of the juvenile product 12 (e.g., turn it on and off, select operating modes, etc.). One or more controllers 26 (e.g., motor controller integrated circuits) may control the juvenile product's motion- or vibration-imparting actuators 28, based on commands from the processor 20, to thereby control the movement (motion and/or vibration) of the juvenile-supporting structure of the juvenile product 12.

U.S. published patent application Pub. No. 2016/0058201, which is incorporated herein by reference in its entirety, describes a juvenile bouncer seat having a juvenile-supporting structure, e.g., a fabric covering around a frame, and a vibration motor that imparts vibrations to the frame to thereby vibrate the juvenile-supporting structure. Such a bouncer seat is an example of juvenile product 12 for which embodiments of the present invention could be used, with the vibration motor being an example of the actuator 28 shown in FIG. 1. U.S. Pat. No. 8,239,984, which is also incorporated herein by reference in its entirety, describes a baby swing with two motors—a first motor for vertical reciprocating motion of the juvenile-supporting structure and a second motor for horizontal reciprocating motion.

Such a baby swing is another example of juvenile product 12 for which embodiments of the present invention could be used, with the two motors being examples of actuators 28 shown in FIG. 1. Other types of juvenile products could also be used in various embodiments of the present invention, including products with a third motor, and products that combine one or more reciprocating motion motors with one or more vibration motors, or other types of motion imparting actuators. More details about exemplary juvenile products are provided below.

As also shown in FIG. 1, the juvenile product 12 may include wireless communication circuits for wireless communication with remote devices or networks, such as the mobile device 10 or the network 16. For example, as shown in FIG. 1, the juvenile product 12 could include WiFi (IEEE 802.11x) and/or Bluetooth communication circuits 30, 31. It could also include other types of wireless communication capabilities, such as, alternatively or additionally, circuits for NFC, ZigBee, Z-Wave, or Wireless USB wireless communications, for example, that allow the juvenile product 12 to communicate wirelessly with the mobile device 10 and/or the network 16.

The computer data network 16 can comprise the Internet, WiFi networks, LANs, WANs, etc. The mobile device 12 may connect to the computer data network 16 via a WiFi network or the mobile device's cellular network interface or any other suitable means. Similarly, a juvenile product 12 that is equipped with WiFi and/or a cellular network interface, for example, could connect to the computer data network 16.

A user of the mobile device 10 may download the mobile app 50 from the server 14. Also, in various embodiments, the server 14 may perform calculations related to the user-defined stimulation pattern, as described further below. Figure shows one remote server 14 for the sake of simplicity. The functions described herein for the remote server 14 may be distributed across multiple servers that are connected to the network 16. Those multiple servers could be co-located at a common data center, or could be at various locations on the network 16.

Figure 3:
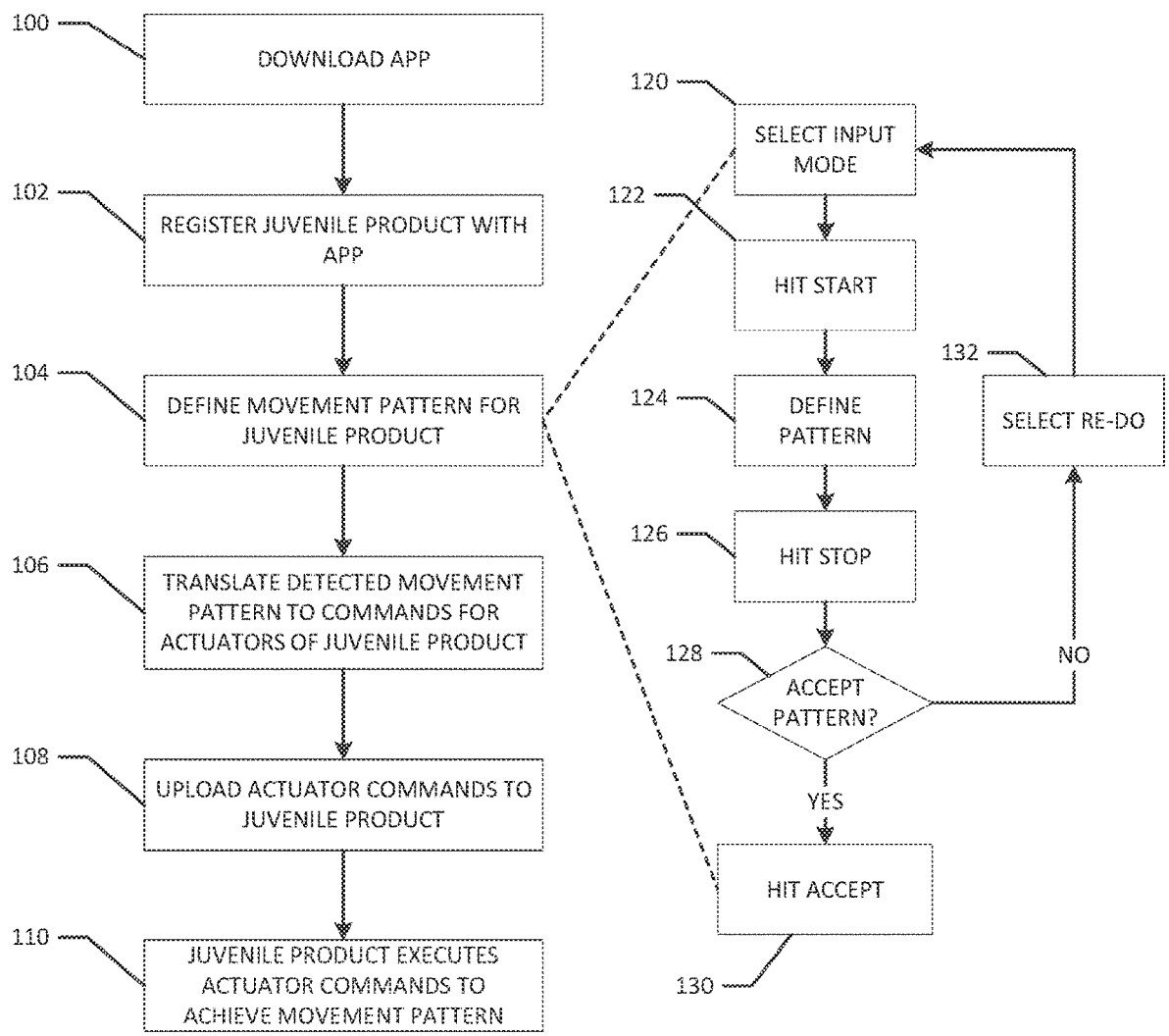
FIGS. 3 and 4 illustrate process flows according to various embodiments of the present invention.

FIG. 3 is a flow chart of a process that can implemented with embodiments of the present invention. At step 100, the mobile device 10 user downloads the mobile app 50 from the server 14 to the mobile device 10. The mobile app 50 is stored in memory 62 of the mobile device 10 for execution by the processor 60. At step 102, the mobile device user can register their juvenile product 12 so that it is linked to the mobile app 50. For example, the app 50 may require the mobile device user to create a user ID and a password, that are transmitted to and stored by the server 14. The mobile device user can then register the juvenile product 12 by inputting an ID for the juvenile product 12 that is associated with the mobile device user's user ID. For example, the mobile device user could register the juvenile product 12 by inputting a serial number of the juvenile product 12 or taking a picture of the bar code for the juvenile product 12 with the mobile device's camera 38. The juvenile product ID is then uploaded from the mobile device 10 to the server 14, which stores the juvenile product ID associated with the mobile device user's user LO so that the two are linked. The juvenile product ID preferably identifies the make and model of the juvenile product 12. A database of the server 14 may store specifications for various makes and models of juvenile products, such as the types of actuator(s) that each make/model has and the capabilities of the actuator(s) (e.g., their range of motion, speed and power levels, etc.).

Next, at step 104, the mobile device user can define a stimulation pattern for the juvenile product 12 through the mobile device/app. There are a number of ways in which the mobile device user can define the stimulation pattern and the right-side of FIG. 3 shows a flow chart that depicts ways to define the stimulation pattern at step 104 according to various embodiments.

At step 120, via a selection menu provided on the user interface 40 by the app 50, the mobile device user can select an input mode for defining the stimulation pattern. Exemplary stimulation pattern input modes that could be used with the mobile device/app include tapping a vibration pattern on the touch screen 40, drawing a stimulation pattern on the touch screen 40, moving the mobile device in free space to define a stimulation pattern, or creating or identifying an audio file whose waveform is translated to a corresponding vibration pattern for the juvenile product 12. The mobile app preferably knows what stimulation patterns the juvenile product is capable of and correspondingly only displays options for the mobile device user that are consistent with the capabilities of the juvenile product 12. For example, if the juvenile product 12 only has a vibration motor(s), the app 50 preferably only allows the mobile device user to define vibration patterns for the juvenile product 12, and not other types of stimulation patterns. Conversely, if the juvenile product 12 only has a motor(s) for moving the juvenile-supporting structure in one or more dimensions, and no vibration motors, the app 50 preferably only allows the mobile device user to define motion patterns for the juvenile product 12, and not vibration patterns. Of course if the juvenile product has both motion and vibration capabilities, the app 50 can allow the mobile device user to select either motion or vibration patterns or both. The mobile app 50 recognizes the capabilities of the juvenile product 12 because when the juvenile product 12 is paired with the app 50 during the registration process (step 102 of FIG. 3), the server 14 can download to the mobile device/app the capabilities of the paired juvenile product 12, or the mobile app 50 can download them in real time from the server 14 when needed by the mobile app 50 at step 104.

Once the desired mode is selected, at step 122 the mobile device user can press or otherwise activate a "start" button or icon, or the like, on the app's display on the user interface 40 of the mobile device 10. Then, at step 124, the mobile device user can define the stimulation pattern. For a tapped vibration pattern input mode, the mobile device user can tap the mobile device's touch screen 52 according to the desired vibration pattern for the juvenile product 12. The taps can be long or short in duration, and can be spaced by desired time intervals. The touch pad circuitry 52 of the user interface 40 captures the duration, intensity, and timing of the taps, until the user presses or otherwise activates a "stop" button or icon, or the like, on the app's display on the user interface 40. Data indicative of captured vibration pattern is stored in the memory 62 and processed by the processor 60. At step 128, the mobile device 10 (executing the app 50) can replicate the recorded vibration pattern to see if it is acceptable to the mobile device user by activating its vibrator(s) 47 to replicate the recorded vibration pattern in terms of the duration, intensity, and timing of the taps. Alternatively or additionally, the processor 60 could activate one or more LEDs or other light sources of the mobile device 10 that blink on and off in concert with the recorded vibration pattern (LEDs on for vibration and off for periods of no vibration). Different LEDs colors could even be used for different tap intensities or durations, or combinations thereof. If the mobile device user approves the pattern, the mobile device user can press or otherwise activate an "accept" button or icon, or the like, on the app's display on the user interface 40 of the mobile device 10, which completes the mobile device user's definition of the new stimulation pattern. If the mobile device user is not satisfied, at step 132 the mobile device user can try again by pressing or otherwise activating a "re-do" button or icon, or the like, on the app's display on the user interface 40 of the mobile device 10, which restarts the process at step 120.

As another example, if at step 120 the mobile device user selects the "draw" input mode to draw a motion pattern on the user interface touch screen, then (i) at step 122 the mobile device user can hit the start button to (ii) at step 124 draw the desired two-dimensional motion pattern on the mobile device's user interface touch screen until (iii) the user hits the stop button at step 126. The mobile device user has to draw the pattern with an implement that is detectable by the touch screen 52. If the touch screen is a capacitive touch screen, the user can draw the pattern with an electrically conductive implement, such as the mobile device user's finger, for example. If the touch screen is a resistive touch screen, other types of implements (e.g., gloved fingers, stylus, etc.) could be used and detected by the touch screen 52. In any case, the touch screen 52 can capture (e.g., detect and record) the movement of the user's finger (for example) on the touch screen 52 between activation of the start and stop buttons at steps 122 and 126. Data indicative of captured stimulation pattern is stored in the memory 62 and processed by the processor 60. The processor 60, executing the software of the app 50, can display the 2D pattern on the user interface 40 of the mobile device 10 after it is captured by the touch screen 52 so that the mobile device user can accept or reject the pattern at steps 128 to 132. The 2D stimulation pattern can be displayed on the mobile device by a lighting pattern, for example, that corresponds to or replicates the captured 2D stimulation pattern drawn on the touch screen 52 by the mobile device user at step 124.

Another input mode at step 120 is that the user could select to move the mobile device 10 in free space to define a motion pattern for the juvenile product having up to three dimensions (and up to six degrees of freedom). For example, the mobile device user could rock or sway the mobile device 10 similarly to the way that the mobile device user rocks or sways the juvenile when holding the juvenile. That way, the mobile device user's own rocking or swaying pattern can be detected by the mobile device/app and uploaded to the juvenile product 12 for replication by the juvenile product 12. At step 124, between activating the start and stop buttons at steps 122 and 126, the movement of the mobile device 10 in up to three dimensions (and up to six degrees of freedom) can be detected and captured at step 124 by the mobile device's accelerometer and gyroscope systems 34, 36. The captured motion pattern can then be displayed on the user interface 40, such as with a lighting pattern, so that the mobile device user can accept or reject it at steps 128 to 132. In various embodiments, the motion displayed on the user interface 40 can be in two dimensions (X and Y), with the vertical dimension (Z) eliminated for purposes of the replication. In other embodiments, the intensities of the lights and/or different colors can be used to indicate changes in the vertical position.

Another input mode at step 120 is that the user could select to input a sound (audio recording), whose waveform is translated to a vibration pattern for the juvenile product 10. In such an input mode, at step 124, between activating the start and stop buttons at steps 122 and 126, the mobile device user could sing a song, hum a tune, play an instrument, or play a music recording, for example. The mobile device's microphone 39 can pick up the sound and the processor 60 (executing the app 50) can convert the waveform for the captured audio to a vibration pattern for the juvenile product 12. For example, high amplitude portions of the waveform can correspond to high intensity vibrations, and vice versa, and long amplitude portions of the waveform can correspond to long vibrations, and vice versa. Also, the vibration timing can correspond to or be proportional to the amplitude spacing in the waveform (e.g., the timing between successive vibrations can correspond to the timing between successive high amplitude portions of the wave). The processor 60 can replicate the vibration pattern through its vibrators 47 and/or lights so that the mobile device user can accept or reject the corresponding vibration pattern at steps 128 to 132. The mobile device 10 could also play the captured sound recording through its speakers 45 in concert with the displayed vibration pattern. The captured sound can also be uploaded in a file to the juvenile product 12 for playing by speakers of the juvenile product 12 in concert with the corresponding vibration pattern.

Another way that the mobile device user could define a new stimulation pattern for the juvenile product is to use an audio file stored on the mobile device 10 (or a portion of the audio file), with the waveform for the audio file being converted to a vibration pattern for the juvenile product 12, as described above. For example, the user interface 40 of the mobile app 50 may allow the mobile device user to select an option to create a vibration pattern for the juvenile product 12 using a new audio recording or to use an audio file already stored on the mobile device 10. A new audio recording can be translated to a vibration pattern as described in the prior paragraph. If the user selects to use an already-stored audio file, the mobile app 50 may link to the audio files on the mobile device 10 and display a listing of the stored audio files. When the user selects one of the stored audio files, the mobile app 50 (through its user interface) can ask the mobile device user if it wants to user the entire audio file or just a portion of it. If the mobile device user selects to use a portion of the audio file, the mobile app 50 can play the audio file, and simultaneously provide input buttons or controls where the user could indicate the start and stop times of the portion of the audio file to be used for the vibration pattern. The waveform of the audio file (whether the entirety of it or just a portion) can be translated to a vibration pattern for the juvenile product as described above. As before, the audio file can also be uploaded to the juvenile product 12 for playing by speakers of the juvenile product 12 in concert with the corresponding vibration pattern.

In yet another embodiment, the mobile device's camera could recognize a motion pattern defined by the user. For example, the camera 38 could include video recording capabilities, and the camera 38 could record a motion pattern drawn by the user on a suitable surface. The mobile device's processor 60 can then translate the captured motion pattern drawn by the user to motion vectors that are representative of the user's drawn pattern. The mobile device's processor 60 and/or the juvenile product's processor 20 can then translate the motion vectors to control signals for the actuator(s) 28 to implement the user-defined pattern.

Once the stimulation pattern is defined by the mobile device user and captured by the mobile/device app, the mobile device user can assign a name or other type of ID to it (e.g., "Pattern A") so that the user can select it later. A number of different patterns can be defined in this manner and each assigned a different name for later recall and execution by the juvenile product 12.

Returning to the left side of FIG. 3, the stimulation pattern is scaled or otherwise translated to drive commands for the actuator(s) 28 of the juvenile product 12. For example, for vibration patterns, the detected timing and intensity of the touches (or amplitudes in the audio waveform) can be scaled to similarly timed pulses, with corresponding amplitudes, for the vibration motor(s) 28 of the juvenile product 12. Similarly, for user-defined 2D and 3D motion patterns, the detected 2D and 3D patterns can be scaled to appropriate command signals for the motion-inducing motor or motors of the juvenile product 12. In various embodiments, this processing can be performed by the processor 60 of the mobile device 10 executing the mobile app 50, in which case the actuator command signals can be uploaded from the mobile device to the juvenile product 12 via the wireless communication link therebetween at step 108. The actuator commands for the user-defined stimulation pattern can be stored in the memory 22 of the juvenile product 12.

In generating the commands for the actuator(s) 28 for the user-defined stimulation pattern, the processor 60 needs data about the actuator(s) 28 of the juvenile product 12 so that it can appropriately scale the user-defined stimulation pattern to the motion range for the juvenile product 12. The data about the actuator(s) 28 of the juvenile product 12 could be downloaded to the mobile device/app from the remote server 14 at the registration step (step 102 of FIG. 3), and/or the data could be downloaded in real time from the remote server 14 to the mobile device 10 at step 106, although such an embodiment requires a suitable data connection between the remote server 14 and the mobile device 10 during step 106.

At step 110, when a user of the juvenile product 12 inputs a command to the juvenile product 12 to execute a particular previously-defined user-defined pattern (Pattern A), the processor 20 of the juvenile product 12 can process data corresponding to the commands stored in the memory 22 and, based on that processing, send control signals to the controller(s) 26 to correspondingly control the actuator(s) 28 of the juvenile product 12 to replicate the user-defined stimulation pattern.

In another embodiment, the remote server 14 may translate the captured stimulation pattern to the actuator command signals for the juvenile product 12 at step 106. Such an embodiment requires a suitable data connection between the mobile device 10 and the remote server 14. The mobile device 10 can transmit data representing the captured stimulation pattern to the remote server 14 via the network 16. The remote server can then process the captured stimulation pattern data to develop the corresponding actuator command signals for the juvenile product 12. Then the server 14 can transmit data for the actuator command signals to the mobile device 10 or the juvenile product 12 via the network 16. If the data for the actuator command signals are transmitted to the mobile device 10, then the mobile device can upload them to the juvenile product at step 108.

In another embodiment, the processor 20 of the juvenile product 12 translates the captured pattern to the corresponding actuator command signals for the juvenile product 12. In such an embodiment, the juvenile product 12 receives the data representing the captured stimulation pattern either directly from the mobile device 10 or indirectly via the remote server 14. The memory 22 of the juvenile product 12 can already store the data about the actuator(s) 28 and/or it can download them from the remote server 14.

Once the actuator command signals are uploaded to the juvenile product 12 at step 108, the juvenile product 12 can be controlled to execute the user-defined stimulation patterns as described above. In various embodiments, the user could select the desired user-defined pattern from the mobile device 10, in which case the selection is transmitted to the juvenile product 12 for execution. In other embodiments, the user could select the desired user-defined pattern from the user interface 24 of the juvenile product 12. As mentioned above, the mobile device user could define numerous stimulation patterns in this manner, with each uploaded to the juvenile product 12 and stored in the memory 22, for later selection by the user via the mobile app or the user interface 24 of the juvenile product 12. Each user-defined pattern could be associated with a unique name or ID to facilitate selection of the desired user-defined pattern. For example, when the user selects to execute a user-defined pattern, the mobile app 50 or the user interface 24, as the case may be, may show the stored user-defined stimulation patterns in a listing or menu, and the user can select the desired one.

In the description above, the mobile device 10 was described as being in wireless communication with the juvenile product 12. It should be noted, however, that in various embodiments, the mobile device 10 and juvenile product 12 could have a wired data connection. For example, each of the mobile device 10 and juvenile product 12 could have a USB-type port that allows a USB cable to be connected therebetween. Any of the wireless data communications between the mobile device 10 and juvenile product 12 described above could be performed with such a wired connection according to various embodiments of the present invention.

Figure 4:
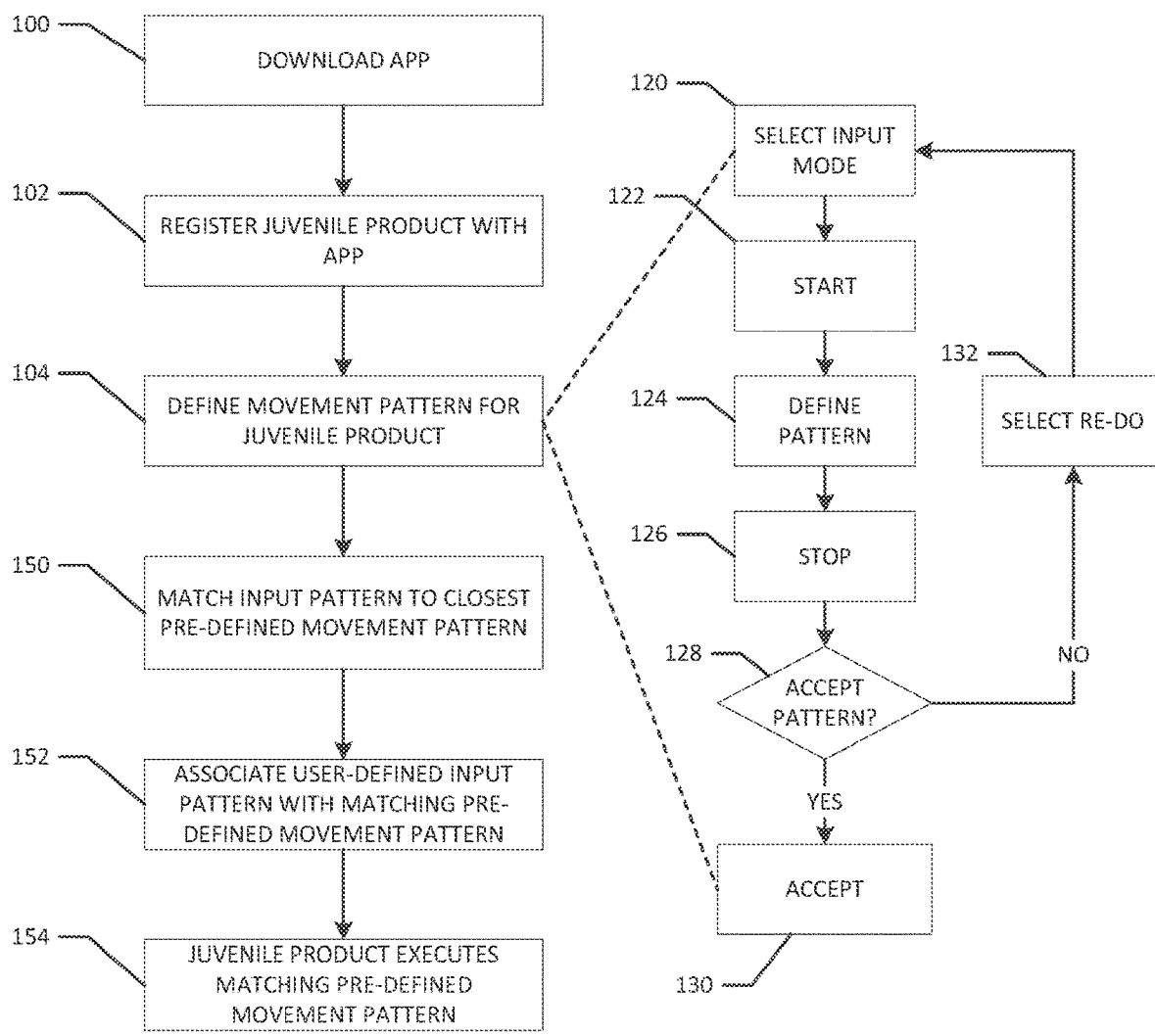

In another possible use mode for the mobile app 50 and juvenile product 12, instead of defining a new stimulation pattern for the juvenile product 12 as described above in connection with FIG. 3, a stimulation pattern input by the mobile device user as described above (e.g., a motion and/or vibration pattern) can be matched to the closest pre-defined stimulation pattern of the juvenile product. For example, as described above, a juvenile product 12 could have numerous manufacturer-defined motion patterns (e.g., five such patterns), each have one or more speed selections (e.g., up to five different speed selections). That creates a number of pre-defined pattern-speed combinations. In such embodiments, instead of creating a new stimulation pattern, the mobile device user's inputted pattern can be matched to the closest pre-defined pattern-speed combination. FIG. 4 is a diagram of such a process according to various embodiments. FIG. 4 is identical to FIG. 3 except that steps 106, 108 and 110 in FIG. 3 are replaced with steps 150, 152 and 154 in FIG. 4.

In the exemplary embodiment shown in FIG. 4, the mobile device user can define (and name) the stimulation pattern in the same manner at step 104. At step 150, the stimulation pattern input by the mobile device user at step 104 can be matched to a pre-defined pattern-speed combination of the juvenile product 12. The matching can be performed by the processor 60 of the mobile device 10, by the remote server 14, by the processor 20 of the juvenile product 12, or by a combination thereof, as described above. The matching can use a multi-dimensional nearest—neighbor algorithm, for example, to determine the closest match between the stimulation pattern input by the mobile device user and the pre-defined stimulation patterns of the juvenile product 12. Then, at step 152, the mobile device user's selected name for the input stimulation pattern can be associated with the matching pre-defined stimulation pattern so that when the user selects to execute the named pattern, at step 154 the juvenile product executes the matching pre-defined stimulation pattern.

Figure 5:
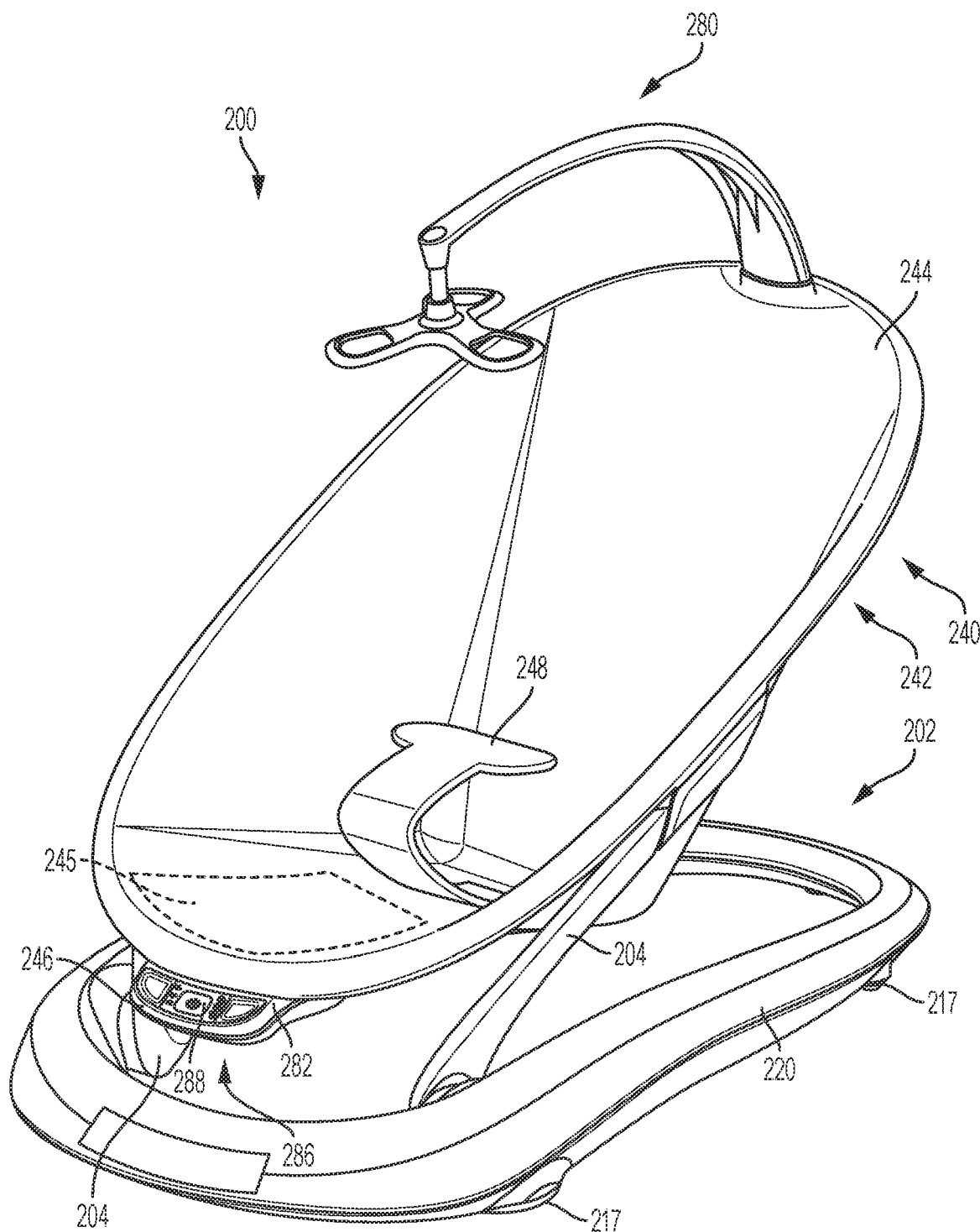
FIGS. 5 to 8 illustrate aspects of an exemplary juvenile product according to various embodiments of the present invention.

More details about exemplary juvenile products are now provided. Referring now to FIG. 5, a juvenile product 200 is depicted, which in this example is a bouncer seat that is configured to support an infant or small child. In the illustrated arrangement, the bouncer seat 200 includes a base assembly 202 that includes a pair of arms 204 and a support base 220. The bouncer seat 200 also includes a seat assembly 240 having a frame or seat ring 242. The bouncer seat 200 is depicted in an assembled configuration, in which the arms 204 of the base assembly 202 are in an extended orientation relative to the support base 220. Additionally, in the assembled configuration, the seat assembly 240 is mounted to the arms 204 of the base assembly 202. A mobile assembly 280 is also attached to the seat assembly 240.

Referring again to FIG. 5, an infant-support sling 244 is attached to the seat assembly 240. The infant-supporting sling 244 includes a restraint 248, which is configured to restrain a child positioned in the seat assembly 240. The infant-supporting sling 244 can be comprised, for example, of fabric, foam, netting, and/or flexible plastic. For example, the infant-supporting sling 244 can be comprised of plastic-coated fabric. The infant-supporting sling 244 can be comprised of a conformable material, which can conform to a child positioned in the seat assembly 240. In certain instances, a substantially rigid or semi-rigid panel 245 can be integrated and/or embedded into the infant-supporting sling 244. Such a panel 245 can be positioned against and/or adjacent to a vibration-generating assembly 246, and can transmit vibrations from the assembly 246, through the sling 244, and to a child positioned in the sling 244.

Figure 6:
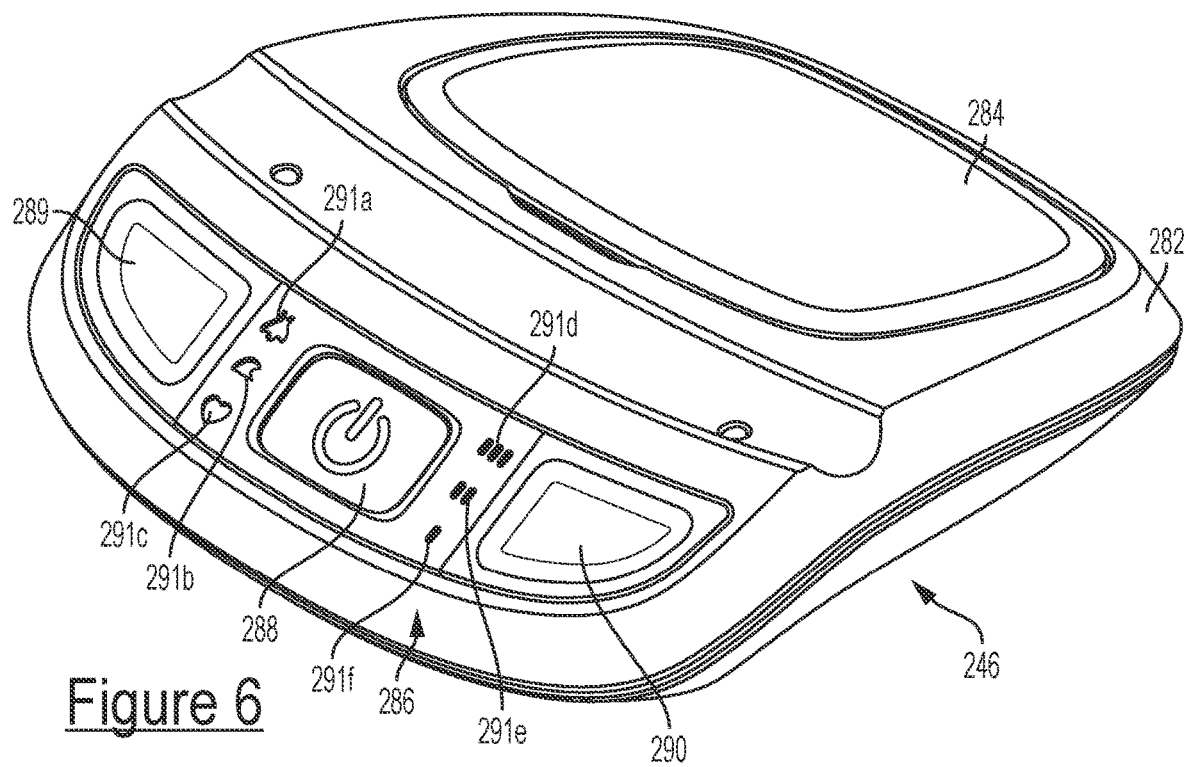
Figure 7:
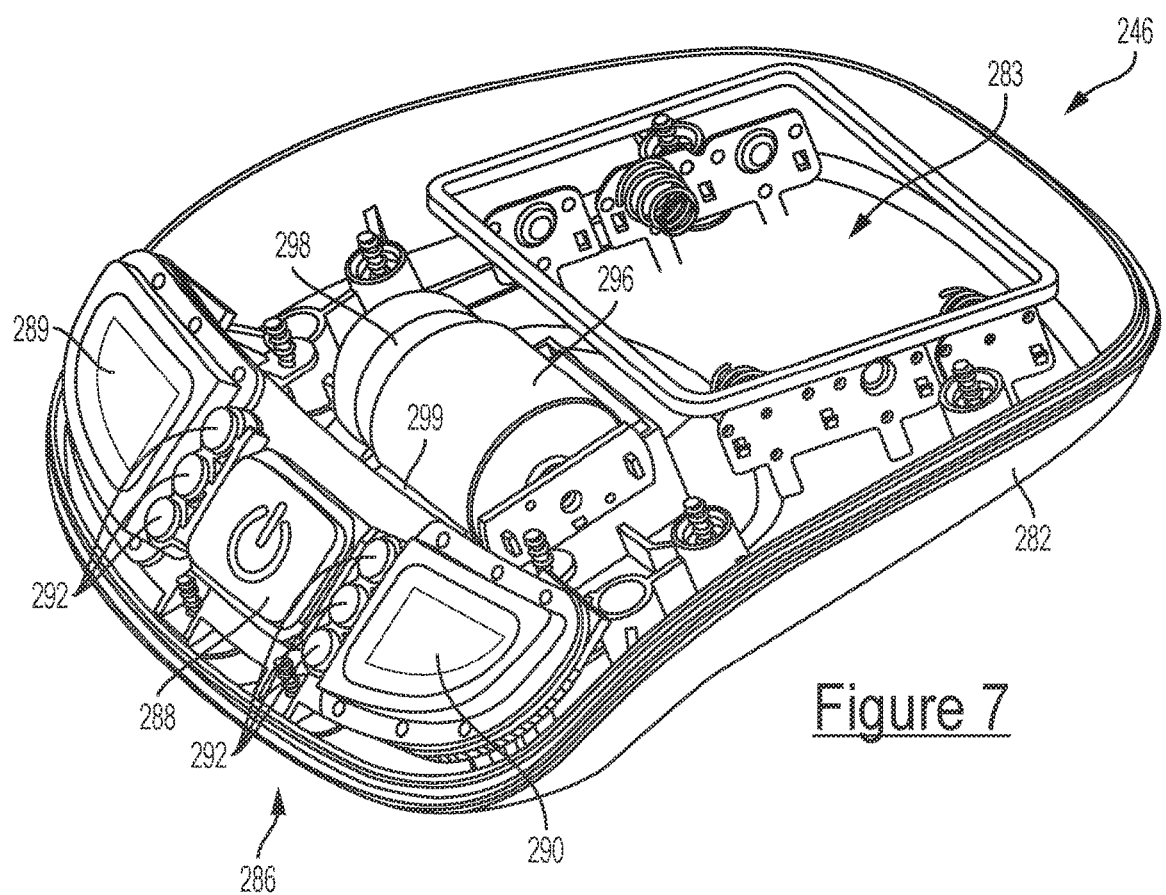
Figure 8:
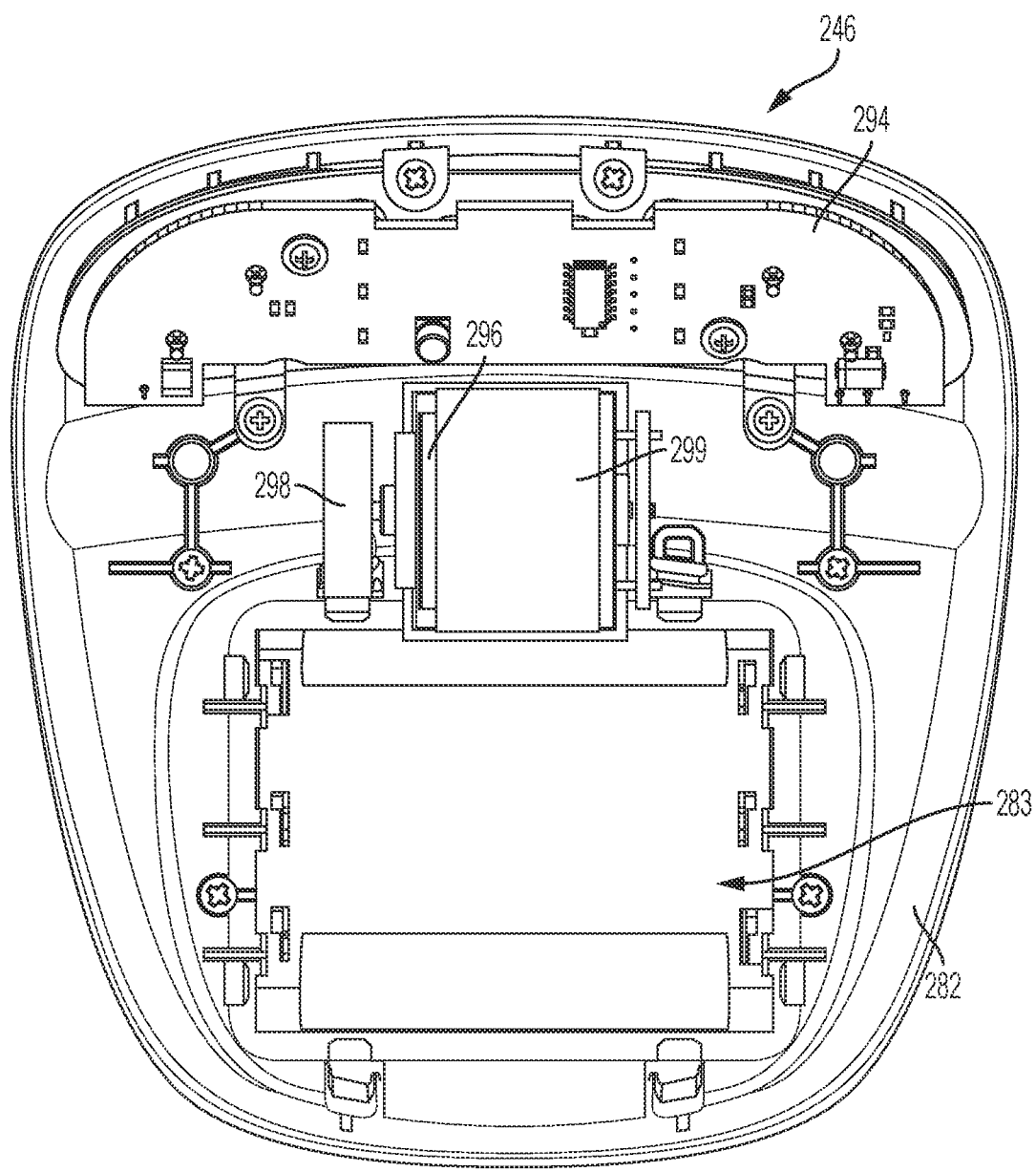

A vibration-generating assembly 246 for the bouncer seat 200 is depicted in FIGS. 6-8. The vibration-generating assembly 246 can implement the user-defined vibration patterns described above. The vibration-generating assembly 246 includes an enclosure 282 housing a plurality of electronics. The enclosure 282 is top-mounted to the seat ring 242. A removable lid or cover 284 (FIG. 6) provides access to the interior of the enclosure 282. In particular, the removable lid 284 provides access to a battery cavity 283, in which batteries for powering the vibration-generating assembly 240 can be held. Referring to FIG. 7, the upper portion of the enclosure 282 has been removed to expose the battery cavity 283. In various instances, the gasket around the battery cavity 283 and/or the battery terminals depicted in FIG. 7 can be housed within and/or attached to the upper portion of the enclosure 282. The cover 284 is positioned on the top of the enclosure 282, which facilitates access to the battery cavity 283 when the device 200 is in an upright position on a support surface (e.g. when the feet 217 are positioned on the support surface). Moreover, the lid 284 is mounted to the enclosure 282. For example, the lid 284 can snap-fit into engagement with the enclosure 282.

The vibration-generating assembly 246 also includes a control panel or user interface 286 (e.g., the user interface 24 of FIG. 1). The control panel 286 includes a power button 288 and adjustment buttons 289 and 290. The adjustment button 289 is configured to adjust the vibrational mode, and the adjustment button 290 is configured to adjust the vibrational intensity for pre-defined vibration patterns of the juvenile product. They can also be used to select previously uploaded user-defined vibration patterns, as described above. The vibrational mode and the vibrational intensity can be communicated to a user via the control panel 286. For example, the control panel 286 includes a plurality of displays or indicators 291*a*, 291*b*, 291*c*, 291*d*, 291*e*, 291*f*. The indicators 291*a*, 291*b* and 291*c* can indicate various pre-defined or user-defined vibration patterns. The indicators 291*d*, 291*e*, and 291*f* correspond to the different vibrational intensities (high, medium, and low, respectively). The indicators 291*a*, 291*b*, 291*c*, 291*d*, 291*e*, 291*f* are illuminated with lights 292 (FIG. 7), which can be LEDs, for example.

Referring primarily now to FIG. 8, the vibration-generating assembly 246 also includes a circuit board 294, which is coupled to a power source, such as at least one battery positioned in the battery cavity 283. The circuit board 294 is also coupled to the power button 288, the adjustment buttons 289 and 290, and the lights 292, which are also coupled to the power source. The circuit board 294 can include a control circuit, including for example the processor 40 and controller 26 shown in FIG. 1, which implements various control sequences. The assembly 246 also includes a motor 296, which is powered by the power source. An eccentric or asymmetrical mass 298 is mounted to an output shaft of the motor 296 such that rotation of the motor 296 output shaft affects rotation of the asymmetrical mass 298.

Actuation of the motor 296 and the corresponding rotation of the asymmetrical mass 298 is configured to generate vibrations, which are then transmitted to the seat ring 242 via the enclosure 282 (see FIG. 5). For example, the enclosure 282 is held against the seat ring 242 by a plurality of fasteners. Additionally, the motor 296 can be held against a portion of the enclosure 282 such that the vibrations generated by the rotating asymmetrical mass 298 are transmitted to the enclosure 282 and, consequently, to the seat ring 242. Vibration of the seat ring 242 affects vibrations of the infant-supporting sling 244 (FIG. 5) supported by the seat ring 242 such that an infant positioned in the sling 244 may be stimulated by the vibrating seat assembly 240.

Referring again to FIG. 8, in the depicted embodiment, a piece of foam 299 is positioned between the motor 296 and a portion of the enclosure 282. The foam 299 is configured to bias the motor 296 against the opposing side of the enclosure 282. Referring primarily to FIG. 8, the foam 299 is positioned on the underside of the motor 296, i.e., between the motor and a lower portion of the enclosure 282. Additionally, the enclosure 282 is top-mounted to the seat ring 242, as further discussed above. In other words, the foam 299 biases the motor 299 against the portion of the enclosure 282 that is connected to the seat ring 242, which can be configured to optimize the transfer of vibrations to the seat ring 242. In various instances, the foam 299 can also hold the motor 296 snugly in place in the enclosure 282 to prevent rattling and/or other undesirable noise generation during operation.

Another exemplary juvenile product 301 is shown in FIGS. 9-17E, this time an infant swing. The illustrated juvenile product 301 includes a base 303, a drive mechanism positioned within a drive mechanism housing 305 disposed on base 303, and a support device 307 coupled to drive mechanism housing 305. Support device 307 includes a seating portion 309 and a seat support tube 311. Seating portion 309 has a generally elliptical shape having an upper end 313 and a lower end 315 when viewed from above. Seating portion 309 is also shaped to resemble a sinusoidal waveform when viewed from the side.

Figure 9:
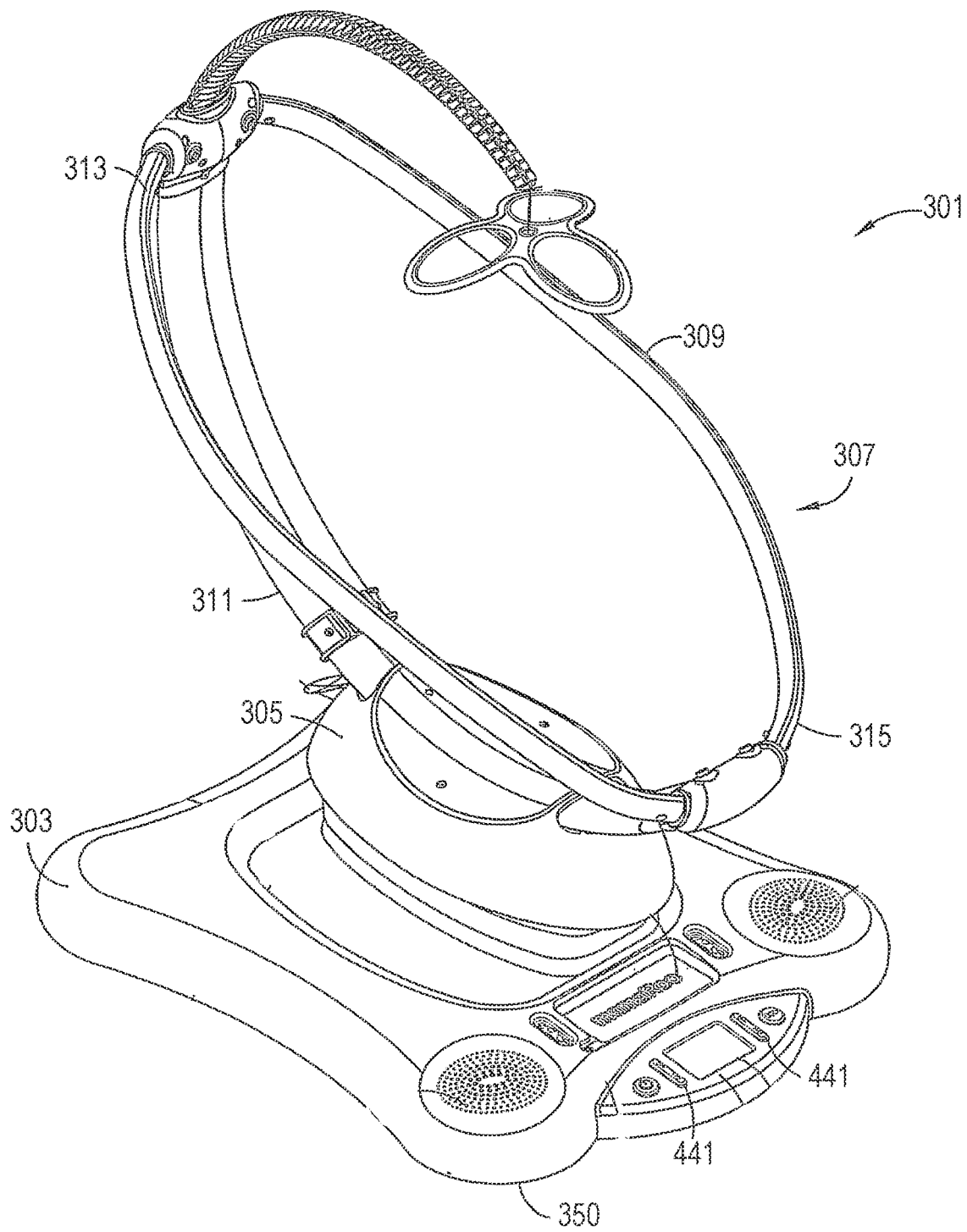
FIGS. 9 to 16 illustrate aspects of another exemplary juvenile product according to various embodiments of the present invention.
Figure 10:
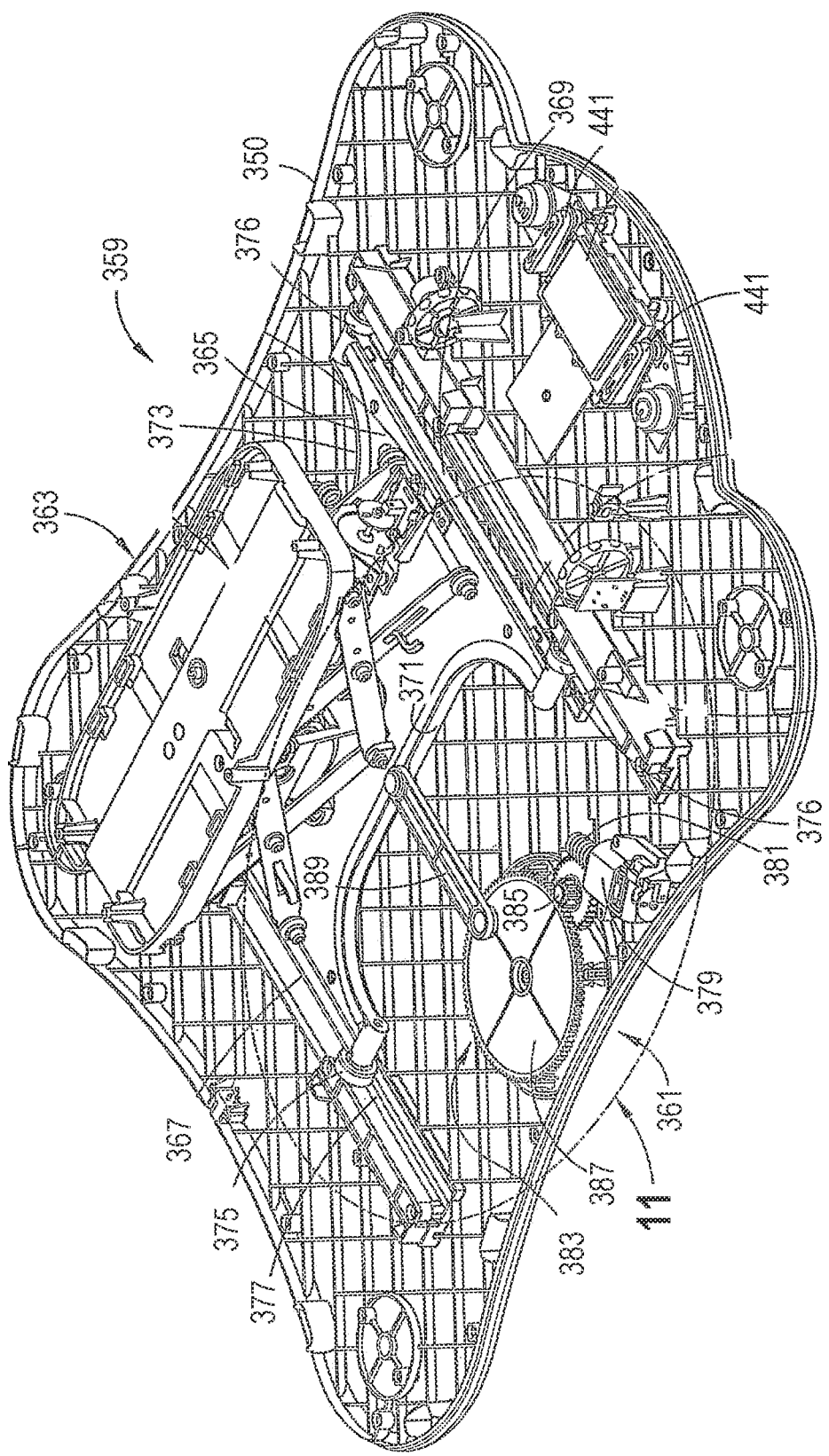
Figure 11:
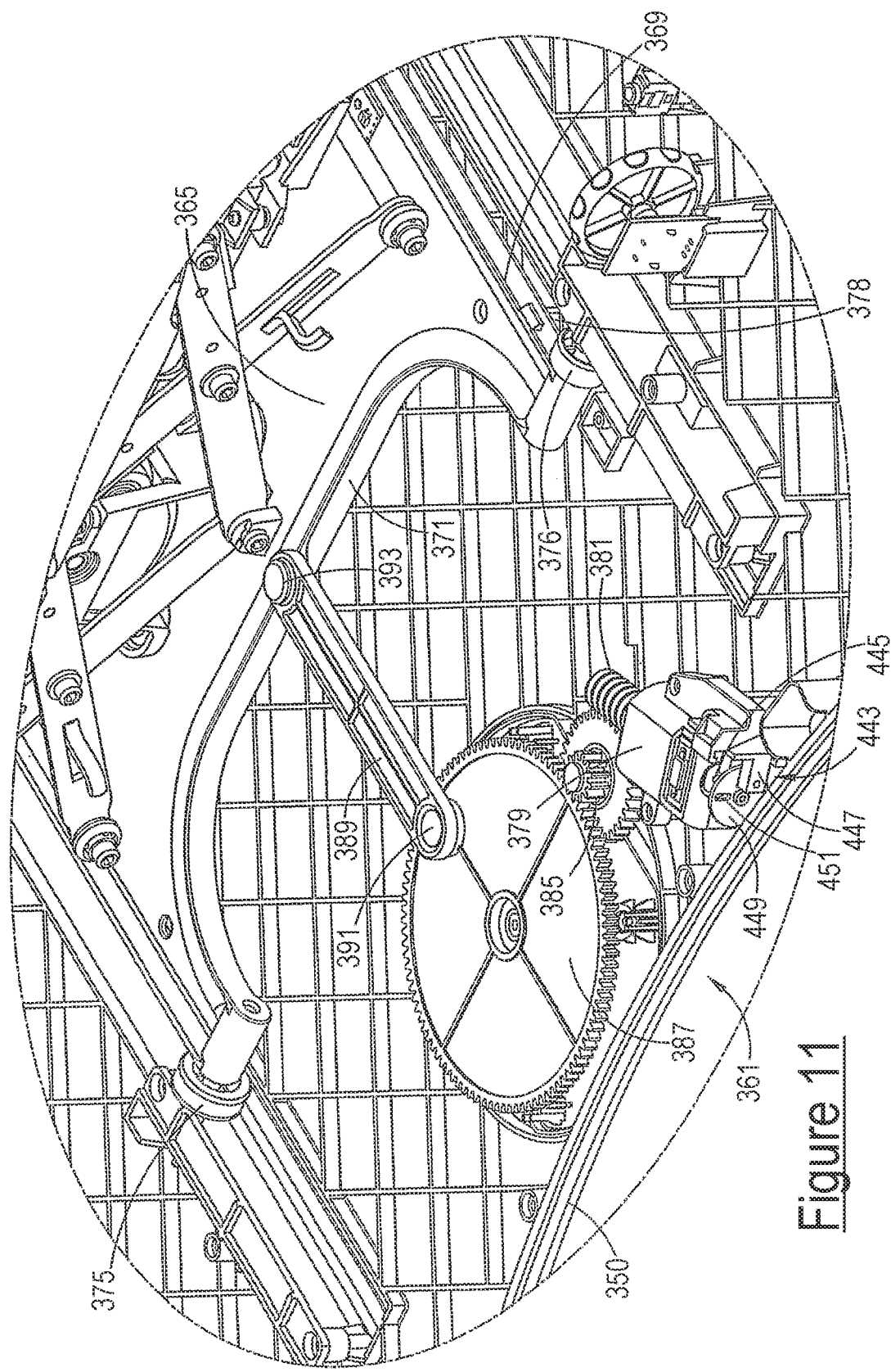

With reference to FIGS. 10-11, and with continuing reference to FIG. 9, the juvenile product 301 further includes a drive mechanism, denoted generally as reference numeral 359, supported by bottom support housing 350 of base 303 and positioned at least partially within drive mechanism housing 305. Drive mechanism 359 includes a horizontal reciprocating assembly 361 for providing horizontal motion and a vertical reciprocating assembly 363 for providing vertical motion.

Horizontal reciprocating assembly 361 includes a rigid platform 365. Rigid platform 365 is generally I-shaped having top and bottom sides 367 and 369, respectively, and left and right sides 371 and 373, respectively. Top side 367 of rigid platform 365 includes at least one grooved wheel 375, and preferably two grooved wheels 375, similar in function and appearance to a pulley wheel, suitably disposed thereon such that top side 367 of rigid platform 365 is rollingly supported by grooved wheels 375. A rail 377 is fixably attached to bottom support housing 350 of base 303. Rail 377 rollingly receives grooved wheels 375 on top side 367 of rigid platform 365. Bottom side 369 of rigid platform 3365 includes at least one wheel 376, and preferably two wheels 376, suitably disposed thereon such that bottom side 369 of rigid platform 365 is rollingly supported by wheels 376. A slot 378 is provided to rollingly receive wheels 376 on bottom side 369 of rigid platform 365. Top side 367 is provided with grooved wheels 375 positioned on a rail 377 while bottom side 369 is provided with wheels 376 positioned within a slot 378 to account for any manufacturing error in rigid platform 365. If rigid platform 365 is too long or short, wheels 376 will "float" a slight amount within slot 378 to account for this manufacturing error. Thus, in a preferred embodiment, horizontal reciprocating assembly 361 is capable of rolling back and forth along rail 377 and slot 378, thereby allowing a horizontal displacement of the horizontal reciprocating assembly 361 of approximately three inches.

Horizontal reciprocating assembly 361 further includes a first motor 379 having a drive shaft 381 mounted to bottom support housing 350 and a slide crank assembly, denoted generally as reference numeral 383, also mounted to bottom support housing 350. Slide crank assembly 383 includes a gearing assembly having a set of first gears 385 operationally coupled to drive shaft 381 of first motor 379 and a large second gear 387 operationally coupled to first gears 385. Slide crank assembly 383 further includes a crank member 389 having a first end 391 and a second end 393. First end 391 of crank member 389 is rotationally coupled to a point on the outer circumference of second gear 387, and second end 393 of crank member 389 is fixedly coupled to a point approximately in the center of left side 371 of rigid platform 365. In operation, actuation of first motor 379 causes rotation of first gears 385 which in turn causes rotation of second gear 387. The rotation of second gear 387 causes crank member 389 to either push or pull rigid platform 365, depending on the position of crank member 389. This operation effects a reciprocating horizontal movement of rigid platform 365, along with everything mounted thereon, back and forth along rails 377. Accordingly, this system allows a single motor (i.e., first motor 379) to move rigid platform 365 back and forth with the motor only running in a single direction, thereby eliminating backlash in the system. The system for controlling horizontal reciprocating assembly 361 to achieve the desired motion profile will be discussed in greater detail hereinafter.

With reference to FIGS. 12-16, and with continuing reference to FIGS. 9-11, vertical reciprocating assembly 363 is positioned on rigid platform 365 and is configured to provide vertical movement to support device 307. Vertical reciprocating assembly 363 includes a double scissor mechanism having a first double scissor mechanism 395 operatively coupled to a second double scissor mechanism 397 such that their movement is synchronized. First scissor mechanism 395 and second scissor mechanism 397 are attached between rigid platform 365 and a support platform 399. Various links of left and right double scissor mechanisms 395, 397 have been omitted in FIGS. 12,13, 15, and 16 for purposes of clarity, however the complete structure of one side of the double scissor mechanism is provided in FIG. 14.

First double scissor mechanism 395 includes a first pair of spaced-apart parallel members 401, 401' and a second pair of spaced-apart parallel members 403, 403'. Second double scissor mechanism 397 includes a third pair of spaced-apart parallel members 405, 405' and a fourth pair of spaced-apart parallel members 407, 407'.

Lower ends 401L of the first pair of spaced-apart parallel members 401, 401' and lower ends 407L of the fourth pair of spaced-apart parallel members 407, 407' are rotatably pinned to each other and to rigid platform 365. Likewise, upper ends 403U, 403U' of second pair of spaced-apart parallel members 403, 403', and upper ends 405U, 405U' of third pair of spaced-apart parallel members 405, 405' are rotatably pinned to each other and to the supporting platform 399.

First and second horizontal bars 409, 411 are provided and extend transversely between lower ends of second pair of spaced-apart parallel members 403, 403', and between lower ends of third pair of spaced-apart parallel members 405, 405', respectively, for additional structural stability. In addition, first and second horizontal bars 409, 411 may further include bearing wheels 413 at their ends for supporting vertical reciprocating assembly 363 and supporting platform 399 and allowing smooth translational movement of first and second horizontal bars 409, 411 during operation.

Still further, third and fourth horizontal bars 415, 417 extend transversely between the upper ends 401U, 401U' of the first pair of spaced-apart parallel members 401, 401' and the upper ends 407U, 407U' of the fourth pair of spaced-apart parallel members 407, 407', respectively. Third and fourth horizontal bars 415, 417 include bearing wheels 419 at their ends for supporting support platform 399.

First pair of spaced-apart parallel members 401, 401' is pivotally secured at a central portion thereof to second pair of spaced-apart parallel members 403, 403' via horizontal pivot pins, or the like. Correspondingly, third pair of spaced-apart parallel members 405, 405' is also pivotally secured at their respective central portions to fourth pair of spaced-apart parallel members 407, 407' via horizontal pivot pins, or the like.

Figure 12:
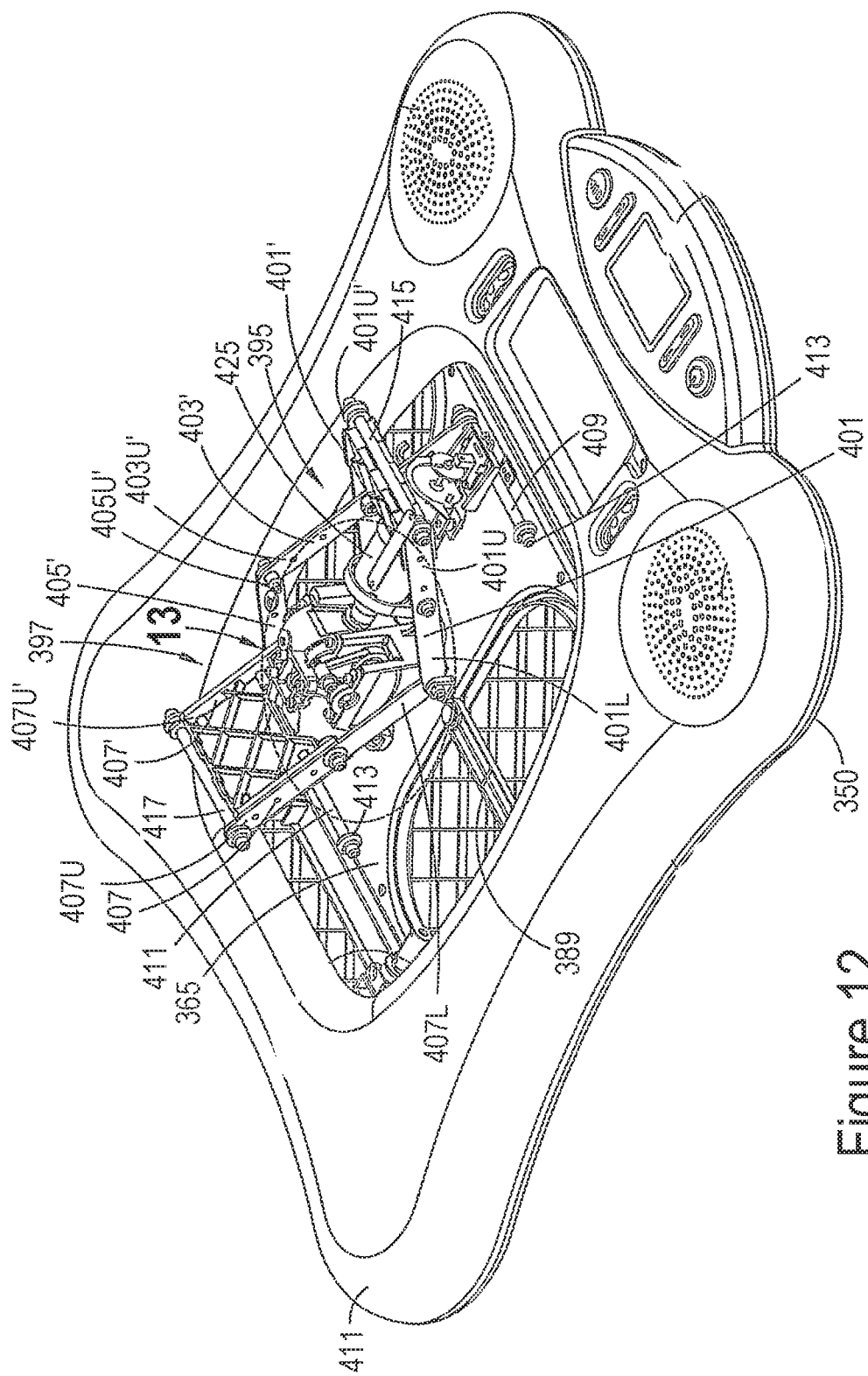
Figure 14:
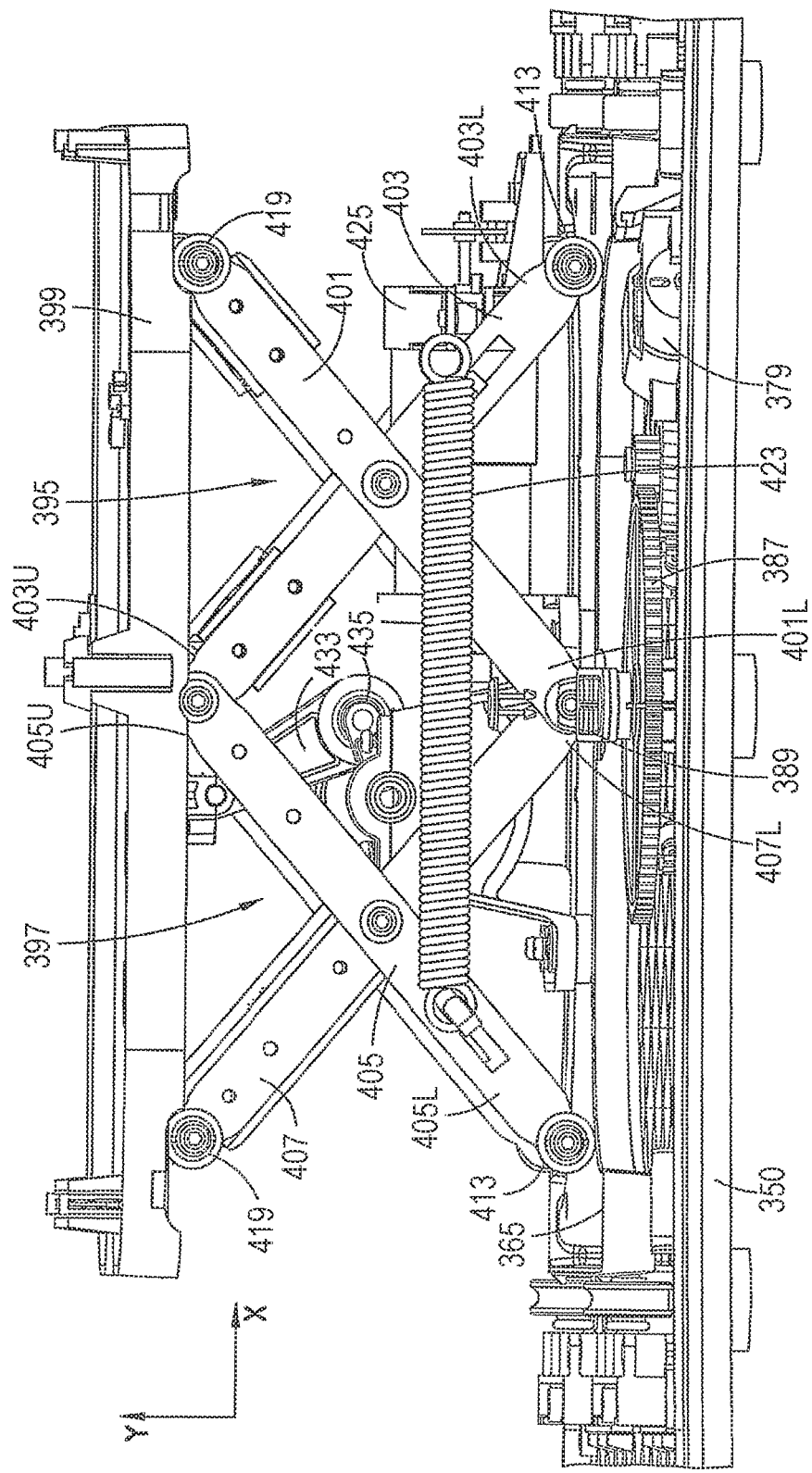
Figure 15:
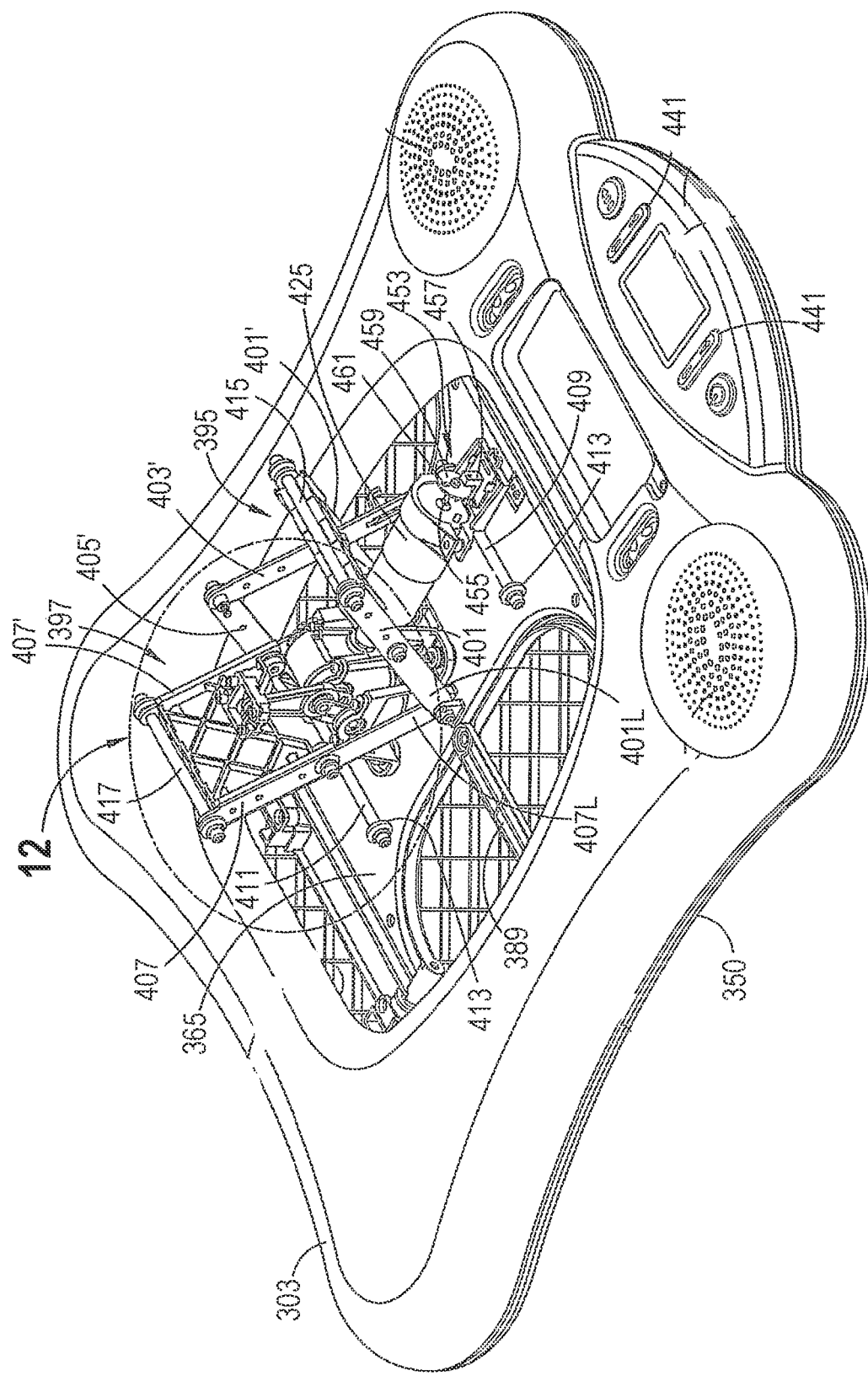
Figure 16:
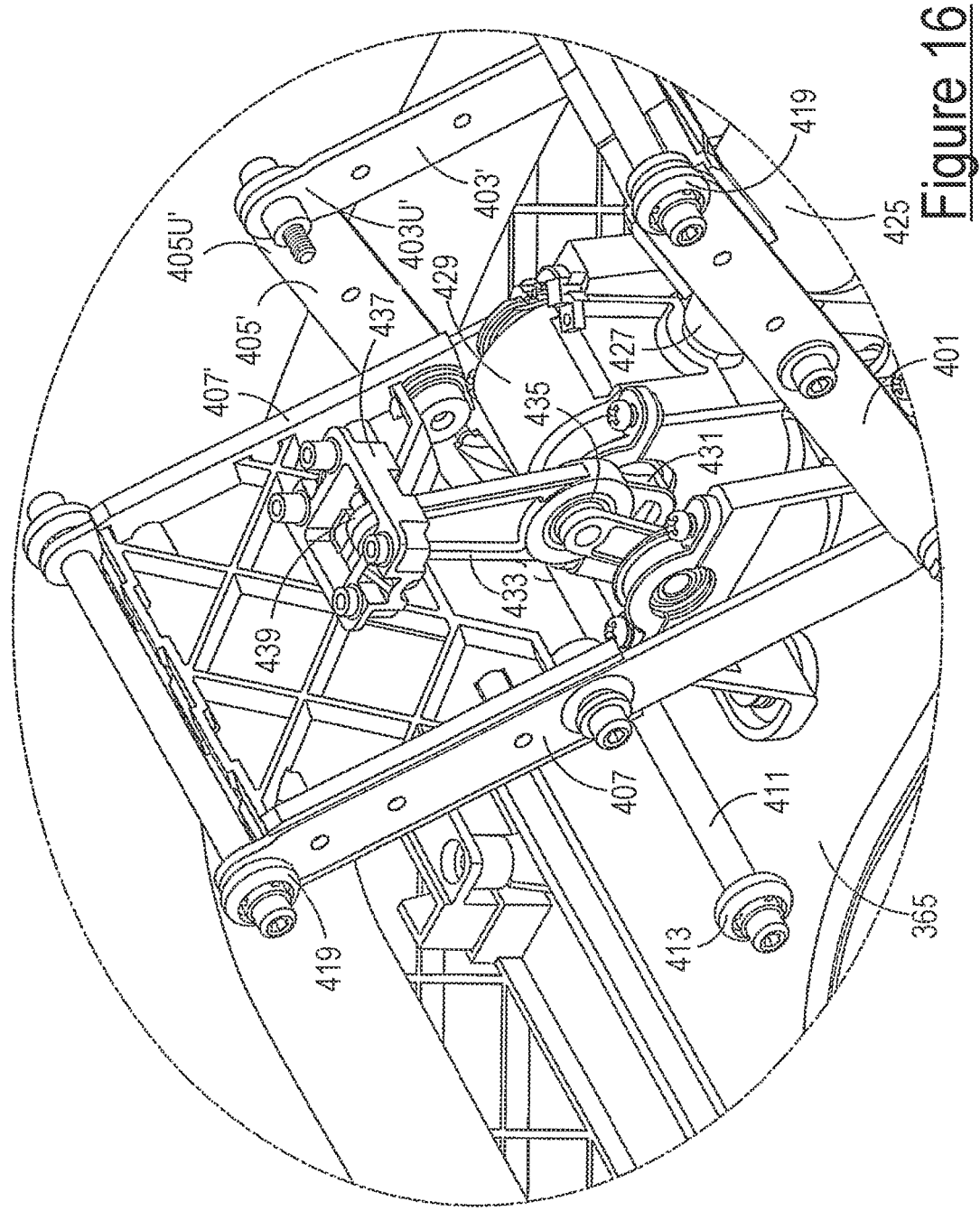

As a consequence of the foregoing description of the double scissor mechanism, when supporting platform 399, which is designed to support seating portion 309, is displaced in a vertically upward direction, both front and rear supporting and non-supporting members move in crossed fashion relative to the pivot pins such that the double scissor mechanism extends between rigid platform 365 and the upwardly displaced supporting platform 399 as illustrated by the successively increased supporting platform 399 height in FIGS. 12, 14, and 15.

Additionally, vertical reciprocating assembly 363 may be provided with at least one, and preferably two, resistive mechanical elements 423, such as a tension spring, fixably attached between lower ends 403L of second pair of spaced-apart parallel members 403, 403' and the lower ends 405L of third pair of spaced-apart parallel members 405, 405' whereby the upward vertical motion of vertical reciprocating assembly 363 is assisted by resistive mechanical element 423 because it pulls the relevant portions of the double scissor mechanism toward each other. The position of restrictive mechanical element 423 described above is not to be construed as limiting as the exact location of the attachment of resistive mechanical element 423 to the double scissor mechanism can be varied with similar results so long as it is attached to portions that get closer together as supporting platform 399 rises away from base 303 and it is attached in a way that assists that movement. Resistive mechanical element 423 also has the benefit of counteracting the effects of gravity because it acts to reduce downward movement when properly placed.

In yet another aspect, the resistive mechanical element 423 comprises a compression spring (not shown) placed in an advantageous position relative to vertical reciprocating assembly 363, such as between rigid platform 365 and supporting platform 399 in order to assist vertical expansion of the double scissor mechanism and resist vertical contraction of the double scissor mechanism.

Figure 13:
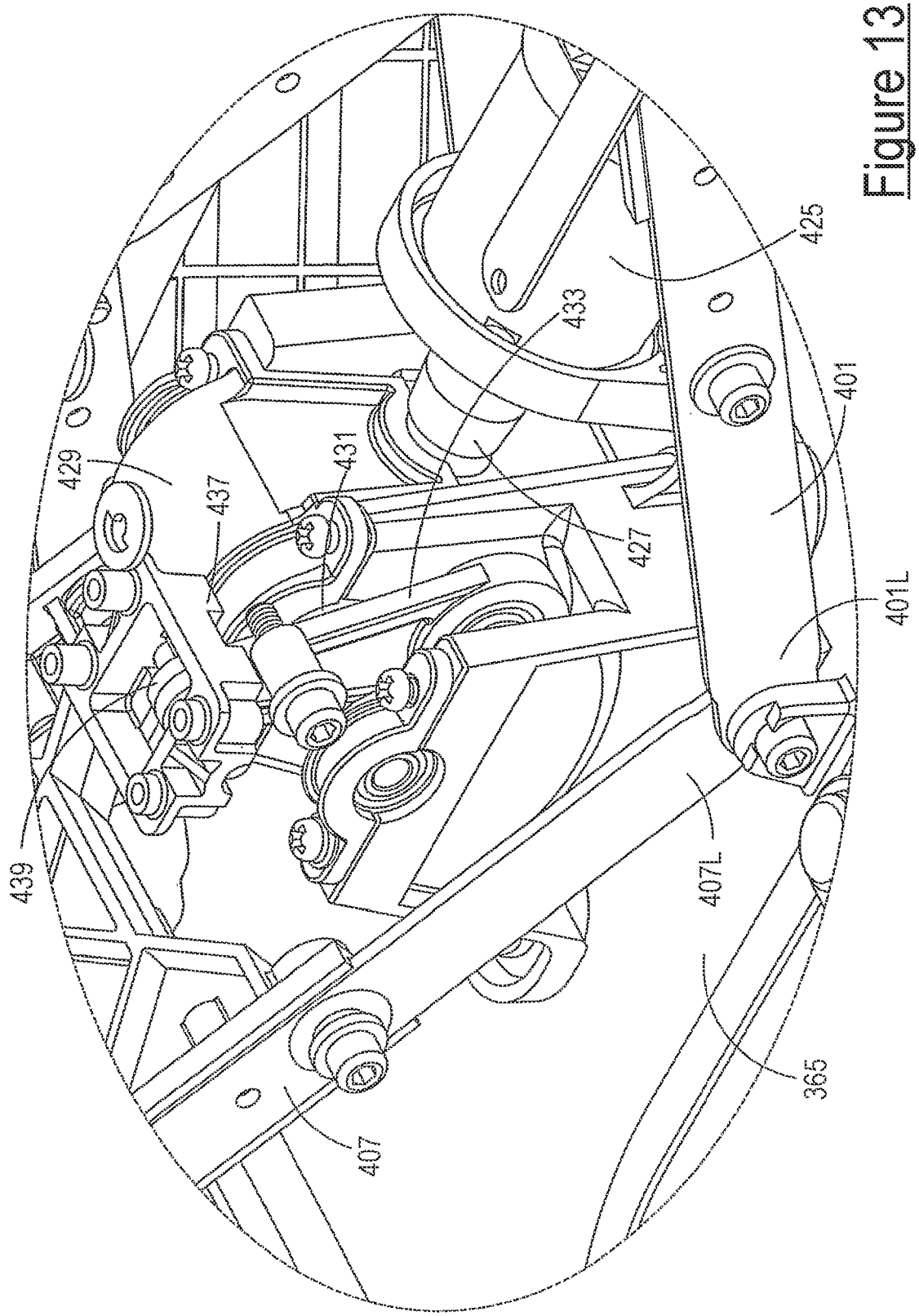

With continued reference to FIGS. 12-14, a second motor 425 is mounted on rigid platform 365. Second motor 425 includes a drive shaft 427 operationally coupled to a worm gear drive assembly 429. Worm gear drive assembly 429 converts rotation of drive shaft 427 to a rotational movement of an output member 431 that is perpendicular to the rotation of drive shaft 427. A vertical yoke 433 is rotatably attached at a first end 435 thereof to output member 431 in a manner such that vertical yoke 433 raises and lowers an attachment member 437 attached to a second end 439 thereof along an axis y shown in FIG. 14. Attachment member 437 is fixedly coupled to supporting platform 399. Accordingly, this system allows a single motor (i.e., second motor 425) to move supporting platform 399 up and down with the motor only running in a single direction, thereby eliminating backlash in the system. The system for controlling vertical reciprocating assembly 363 to achieve the desired motion profile will be discussed in greater detail hereinafter. While vertical reciprocating assembly 363 has been illustrated and described herein as a double scissor mechanism, those skilled in the art will recognize that there are many other configurations to accomplish the same goal.

The control system desirably includes a variety of input sensors. For example, the control system may include a horizontal encoder 443 coupled to a back shaft 445 of first motor 379. Horizontal encoder 443 may include an infrared (IR) sensor 447 and a disk 449 with single hole or slot 451 positioned thereon (see FIG. 11). Horizontal encoder 443 allows the controller to determine the speed and number of revolutions of first motor 379. A vertical encoder 453 may also be provided and is configured to be coupled to a back shaft 455 of second motor 425. Vertical encoder 453 may include an IR sensor 457 and a disk 459 with single hole or slot 461 positioned thereon (see FIG. 15). Vertical encoder 453 allows the controller to determine the speed and number of revolutions of second motor 425 easily and inexpensively.

In one general aspect, therefore, the present invention is directed to a method of defining a stimulation pattern for a juvenile product 12. The method comprises the step of recognizing, by one or more sensor systems of the mobile device 10 that has a mobile application 50 that is linked to the juvenile product 12, a user-defined stimulation pattern for the juvenile product 12. The method further comprises the step of determining, by one or more processors, control signals for one or more actuators 28 of the juvenile product 12 based on the recognized, user-defined stimulation pattern. The one or more actuators 28 are for imparting movement on a juvenile-supporting structure of the juvenile product 12 and the control signals are ultimately stored in a memory 22 of the juvenile product 12. The method further comprises the step of, in response to receiving a command to execute the user-defined stimulation pattern, controlling, by the juvenile product 12, the one or more actuators 28 of the juvenile product 12 based on the stored control signals for the one or more actuators 28 for the user-defined stimulation pattern. For example, the processor 20 of the juvenile product 12 can process the control signals stored in the memory 22 and, based thereon, issue command signals to the controller(s) 26 that control the operation of the actuator(s) 28, to thereby controlling the movement of the juvenile-supporting structure of the juvenile product.

In various implementations, determining the control signal(s) comprises translating the recognized user-defined stimulation pattern to the control signal(s) for the one or more actuators of the juvenile product. In other implementations, determining the control signal(s) comprises matching the recognized user-defined stimulation pattern to a pre-defined stimulation pattern of the juvenile product.

The one or more sensor systems of the mobile device that recognize the user-defined stimulation pattern may comprise one or more accelerometers 34 of the mobile device, in combination with one or more gyroscopes 36, a pressure-sensitive touchscreen 40 of the mobile device, a microphone 39, and/or a camera 38 of the mobile device.

The control signal(s) for the one or more actuators 28 of the juvenile product 12 may be determined by one or more of the processors 60 of the mobile device 10, and the determined control signal(s) can be uploaded from the mobile device 10 to the juvenile product 12. Alternatively, the control signal(s) for the one or more actuators 28 of the juvenile product 12 may be determined by a remote server 14 that is in communication with the mobile device 10 via a computer data network 16. In such an embodiment, the control signal(s) can be uploaded from the remote server 14 to the juvenile product 12, directly or via the mobile device 10. In yet other embodiments, one or more processors 20 of the juvenile product can determine by the control signal(s) based on the user-defined stimulation pattern that is recognized by the mobile device 10 and transmitted to the juvenile product.

In yet another general aspect, the present invention is directed to a system of defining a stimulation pattern for a juvenile product. The system comprises means 34, 36, 40, 39 of the mobile device for recognizing a user-defined stimulation pattern for the juvenile product 12; means 20, 60, 14 for determining control signals for one or more actuators 28 of the juvenile product 12 based on the recognized, user-defined stimulation pattern; and means 20, 22, 26 for controlling, in response to receiving a command to execute the user-defined stimulation pattern, the one or more actuators 28 of the juvenile product 12 based on the control signals for the one or more actuators 28 for the user-defined stimulation pattern.

In yet another general aspect, the present invention is directed to a system that comprises a juvenile product 12 and a mobile device 10 that is in communication with the juvenile product 12. The juvenile product 12 comprises a juvenile-supporting structure, at least one actuator 28 for imparting motion on the juvenile-supporting structure, and one or more juvenile product processors 20. The mobile device comprises one or more sensor systems 34, 36, 40, 49, one or more mobile device processors 60; and a mobile application 50 that is executed by the one or more processors 60, where the mobile application 50 is linked to the mobile device 12. The one or more sensor systems of the mobile device are configured to recognize a user-defined stimulation pattern for the juvenile product. Either the one or more juvenile product processors and/or the one or more mobile device processors are configured to determine control signals for the at least one actuator 28 of the juvenile product 12 based on the recognized, user-defined stimulation pattern. The control signals are stored in a memory 22 of the juvenile product 12 for later execution by the juvenile product 12 in response to the juvenile product 12 receiving a command to execute the user-defined stimulation pattern.

In yet another general aspect, the present invention is directed to a juvenile product that comprises a juvenile-supporting structure and at least one actuator for imparting motion on the juvenile-supporting structure. The juvenile product also comprises a communication circuit for receiving a user-defined stimulation pattern for the juvenile product from an external, mobile device, and a control circuit connected to the communication circuit, wherein the control circuit is for controlling the at least one actuator according to the received user-defined stimulation pattern.

The software for the computer and processor-based devices described herein may be stored on any type of suitable computer-readable medium or media, such as, for example, a magnetic or optical storage medium, and in any suitable type of storage device, such as, for example, a computer system (nonvolatile) memory, an optical disk, magnetic tape, HDD, or SSD. Furthermore, at least some of the processes may be programmed when the computer system is manufactured or stored on various types of computer-readable media.

Some of the figures may include a flow diagram. Although such figures may include a particular logic flow, it can be appreciated that the logic flow merely provides an exemplary implementation of the general functionality. Further, the logic flow does not necessarily have to be executed in the order presented unless otherwise indicated. In addition, the logic flow may be implemented by a hardware element, a software element executed by a computer, a firmware element embedded in hardware, or any combination thereof.

While various embodiments have been described herein, it should be apparent that various modifications, alterations, and adaptations to those embodiments might occur to persons skilled in the art with attainment of at least some of the advantages. The disclosed embodiments are therefore intended to include all such modifications, alterations, and adaptations without departing from the scope of the embodiments as set forth herein.

What is claimed is:

1. A method of inputting a motion pattern for a movable juvenile product with a mobile device, the method comprising:
   registering, with a controller of the juvenile product, mobile device communication signals including motion data embodying movement of the mobile device, imparted by user free motion, input via one or more motion sensor systems disposed within the mobile device and configured to inertially react to and sense the movement of the mobile device, imparted by the user free motion, the mobile device being separate and distinct from the movable juvenile product;
   determining, by one or more processors, of the controller, communicably connected to the juvenile product, control signals for one or more actuators of the juvenile product to implement the motion pattern for the juvenile product based on the motion data that matches or mirrors the user free motion; and
   in response to receiving a command to execute the motion pattern, controlling the one or more actuators of the juvenile product to impart the motion pattern, on the juvenile product, that matches or mirrors the user free motion.

2. The method of claim 1, wherein the movement of the mobile device defines movement of the juvenile product in up to three dimensions of movement.

3. The method of claim 1, wherein the movement of the mobile device defines movement of the juvenile product, that matches or mirrors the user free motion, where the movement of the mobile device, imparted by the user free motion, defines a rocking motion, swaying motion, or a combination of rocking and swaying motion.

4. The method of claim 1, wherein the motion data embodying movement of the mobile device, imparted by the user free motion, are uploaded to the juvenile product via a wireless communication link.

5. The method of claim 1, wherein the movement of the mobile device, imparted by the user free motion, that defines movement of the juvenile product, is displayed on the mobile device.

6. The method of claim 1, wherein the movement of the mobile device is scaled to drive commands of the one or more actuators of the juvenile product.

7. A method of inputting a motion pattern for a movable juvenile product with a mobile device, the method comprising:
   registering, with a receiver of the juvenile product, mobile device communication signals including sensor data embodying movement of the mobile device, imparted by user free motion, input via one or more sensor systems disposed within the mobile device and configured to determine the motion pattern, the mobile device being separate and distinct from the movable juvenile product;
   determining, by one or more processors communicably connected to the receiver of the juvenile product, control signals for one or more actuators of the juvenile product to implement the motion pattern for the juvenile product based on the sensor data that matches or mirrors the user free motion; and
   in response to receiving a command to execute the motion pattern, controlling the one or more actuators of the juvenile product to impart the motion pattern, on the juvenile product, that matches or mirrors the user free motion.

8. The method of claim 7, wherein the one or more processors are of the mobile device, and determining the control signals for the one or more actuators of the juvenile product comprises determining, by the one or more processors of the mobile device, the control signals for the one or more actuators of the juvenile product.

9. The method of claim 8, wherein the control signals for the one or more actuators, determined by the mobile device, are uploaded to the juvenile product via a wireless communication link.

10. The method of claim 7, wherein the one or more processors are of one or more remote servers, and determining the control signals for the one or more actuators of the juvenile product comprises:
   determining, by the one or more processors of the one or more remote servers, the control signals for the one or more actuators of the juvenile product, where the one or more remote servers are in communication with the mobile device via a computer data network; and
   uploading the control signals, determined by the one or more remote servers, from the one or more remote servers to the juvenile product.

11. The method of claim 10, wherein uploading the control signals, determined by the one or more remote servers, from the one or more remote servers to the juvenile product comprises:

transmitting the control signals to the mobile device via the computer data network; and uploading the control signals from the mobile device to the juvenile product via a wireless communication link between the mobile device and the juvenile product.

12. The method of claim 10, further comprising storing the control signals for the one or more actuators in a memory of the juvenile product.

13. A method of controlling a juvenile product based on a predefined stimulation pattern for the juvenile product, the method comprising:

receiving, with a receiver of the juvenile product, mobile device communication signals including data embodying a predefined stimulation pattern for the juvenile product, the mobile device communication signals being registered with one or more sensor systems disposed within a mobile device and configured to determine the predefined stimulation pattern, the mobile device being separate and distinct from the juvenile product and the predefined stimulation pattern being determined by one or more of a camera and microphone of the mobile device;

determining, by one or more processors communicably connected to the juvenile product, control signals for one or more actuators of the juvenile product based on the data embodying the predefined stimulation pattern; and in response to receiving a command to execute the predefined stimulation pattern, controlling the one or more actuators of the juvenile product to impart the predefined stimulation pattern on the juvenile product.

14. The method of claim 13, wherein the one or more processors are of the mobile device, and determining the control signals for the one or more actuators of the juvenile product comprises determining, by the one or more processors of the mobile device, the control signals for the one or more actuators of the juvenile product.

15. The method of claim 14, wherein the control signals for the one or more actuators, determined by the mobile device, are uploaded to the juvenile product via a wireless communication link.

16. The method of claim 13, wherein the one or more processors are of one or more remote servers, and determining the control signals for the one or more actuators of the juvenile product comprises:

determining, by the one or more processors of the one or more remote servers, the control signals for the one or more actuators of the juvenile product, where the one or more remote servers are in communication with the mobile device via a computer data network; and uploading the control signals, determined by the one or more remote servers, from the one or more remote servers to the juvenile product.

17. The method of claim 16, wherein uploading the control signals, determined by the one or more remote servers, from the one or more remote servers to the juvenile product comprises:

transmitting the control signals to the mobile device via the computer data network; and uploading the control signals from the mobile device to the juvenile product via a wireless communication link between the mobile device and the juvenile product.

18. The method of claim 16, further comprising storing the control signals for the one or more actuators in a memory of the juvenile product.

\* \* \* \* \*